United States Patent Office 3,657,229
Patented Apr. 18, 1972

3,657,229
1,3-DIAZA-2,3-CYCLOALKENE DERIVATIVES
Denis M. Bailey, Greenbush, N.Y., assignor to Sterling Drug Inc., New York, N.Y.
No Drawing. Filed May 2, 1968, Ser. No. 726,212
Int. Cl. C07d *53/02, 51/28, 49/34*
U.S. Cl. 260—239 BC                5 Claims

ABSTRACT OF THE DISCLOSURE

2 - [α-(lower-alkoxy)benzyl] - 2 - imidazolines, -1,4,5,6-tetrahydropyrimidines and -4,5,6,7-tetrahydro-1H-1,3-diazepines, having pharmacological properties, e.g., hypoglycemic, diuretic, anti-inflammatory, are prepared by heating a 2-(lower-alkoxy)-2-phenylalkanenitrile with an alkanediamine, wherein 2, 3 or 4 carbon atoms, respectively intervene between the two amino groups, in the presence of a catalytic amount of carbon disulfide or hydrogen sulfide. The intermediate 2-(lower-alkoxy)-2-phenylalkanenitriles are prepared preferably by first reacting a benzaldehyde with a tri-(lower-alkyl) orthoformate to form the aldehyde di-(lower-alkyl) acetal, reacting the latter with an acyl halide to form the corresponding α-halobenzyl lower-alkyl ether and reacting said ether with an alkali cyanide to yield said intermediate nitrile.

This invention relates to compositions of matter known in the art of chemistry as 2-benzyl-1,3-diaza-2,3-cycloalkenes and to their preparation.

The invention in its composition aspect resides in the compounds having the Formula I

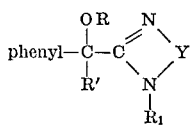

where R is lower-alkyl, R' is hydrogen, lower-alkyl or lower-alkenyl, $R_1$ is hydrogen or lower-alkyl, and Y is alkylene of 2–8 carbon atoms in which 2–4 carbon atoms intervene between the valence linkages, said compounds being, respectively, 2-imidazolines, 1,4,5,6-tetrahydropyrimidines and 4,5,6,7-tetrahydro-1H-1,3-diazepines. The compounds of this composition aspect of the invention, when tested according to standard pharmacological evaluation procedures in animals, have been found to possess the inherent applied use characteristics of having pharmacological properties, e.g., anti-inflammatory and hypoglycemic activities. Further, said tetrahydropyrimidines and tetrahydro-1H-1,3-diazepines of the invention have been found to have diuretic activity, as determined by standard pharmacological procedures.

The above 2-imidazolines and 1,4,5,6-tetrahydropyrimidines of Formula I are disclosed and claimed in copending application Ser. No. 26,787, filed Apr. 8, 1970, a continuation-in-part of the instant application.

The substitution of simple moieties on the benzene ring of phenyl in the compounds of the invention does not adversely affect the pharmacological activity of the compounds. Illustrative but not limitative examples of such simple moieties are lower-alkyl, lower-alkoxy, halo, trihalomethyl, lower-alkylmercapto, lower-alkylsulfonyl, di-(lower-alkyl)amino, amino, hydroxy, nitro and benzyloxy. Such substituent moieties can be in any available position of the benzene ring and where more than one, preferably no more than three, can be in any position relative to one another. Also, phenyl in the compounds of the invention can be replaced by other simple ring moieties without affecting the pharmacological activity of the compounds. Illustrative but not limitative examples of such other simple ring moieties are naphthyl, indanyl, biphenylyl, cyclohexenyl and cyclohexyl.

The terms "lower-alkyl" and "loweralkoxy", as used herein, respectively, mean alkyl and alkoxy radicals having from one to six carbon atoms which can be arranged as straight or branched chains, among which are, for purposes of illustration but without limiting the generality of the foregoing, methyl, ethyl, n-propyl, isopropyl, sec-butyl, isobutyl and n-hexyl for lower-alkyl; and, by methoxy, ethoxy, n-propoxy, isopropoxy, isobutoxy, n-amoxy and n-hexoxy for lower-alkoxy.

The term "lower-alkenyl," as used herein, means alkenyl radicals having from three to six carbon atoms, among which are, for purposes of illustration but without limiting the generality of the foregoing, 2-propenyl (allyl), 2-butenyl, 2-methyl-2-propenyl, 2-hexenyl, and the like.

The invention sought to be patented, in its process aspect, is described as residing in the process for the preparation of the composition aspect of the invention, that is, the compound of Formula I, which comprises heating a 2-(lower-alkoxy)-2-phenylalkanenitrile of Formula II

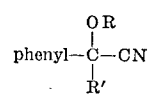

with an alkanediamine of the Formula III

in the presence of a catalytic amount of carbon disulfide or hydrogen sulfide, where R, R', $R_1$ and Y have the meanings given hereinabove for Formula I.

In the above-described process where the alkane-diamine of Formula III has 2, 3 or 4 carbon atoms intervening between the valence linkages of alkylene (Y), i.e., between the two amino nitrogen atoms, the resulting products are, respectively, 2-[α-(lower-alkoxy)benzyl]-2-imidazolines, 2-[α-(lower-alkoxy)benzyl]-1,4,5,6-tetrahydropyrimidines or 2-[α-(lower-alkoxy)benzyl]-4,5,6,7-tetrahydro-1H-1,3-diazepines.

The alkanediamine of Formula III used in the above condensation can have a hydroxy or lower-alkoxy substituent on a carbon atom not bearing an amino group, and the use of such diamines gives rise to 2-[α-(lower-alkoxy) benzyl]-1,4,5,6-tetrahydropyrimidines and 2-[α-(lower-alkoxy)benzyl]-4,5,6,7-tetrahydro-1H-1,3-diazepines having hydroxy or lower-alkoxy in the Y portion of Formula I.

Examination of the final products of Formula I, upon infrared and nuclear magnetic resonance spectographic analyses, reveals data confirming the molecular structures assigned to these compounds. These data, taken together with the nature of the starting material, mode of synthesis and results of elementary analyses, positively confirm the structures of the final products.

The manner and process of making and using the invention will now be generally described so as to enable a person skilled in the art of medicinal chemistry to make and use the same, as follows:

PREPARATION OF INTERMEDIATES

The intermediate 2-(lower-alkoxy) - 2 - phenylalkanenitriles (Formula II), examples of which are known, e.g., 2-ethoxy-2-phenylethanenitrile (or α-ethoxyphenylacetonitrile), 2-methoxy-2-phenylethanenitrile and 2-ethoxy-2-(4-methoxyphenyl)ethanenitrile, are prepared by generally known methods. For example, one method found convenient utilized three steps by first reacting the corresponding generally known benzaldehydes with a tri-(lower-alkyl) orthoformate of the formula $HC(OR)_3$ to form the corresponding aldehyde di-(lower-alkyl) acetal of the formula phenyl-$CH(OR)_2$, which is then reacted with a lower-alkanoyl halide, e.g., acetyl chloride, to form the corresponding α-halobenzyl lower-alkyl ether of the formula phenyl-$CHCl(OR)_1$ which in turn is reacted with an alkali cyanide, e.g., sodium cyanide, to yield the α-lower-alkoxy)phenylacetonitrile of the formula phenyl-$CH(OR)CN$, that is, the compound of Formula II where R' is hydrogen. Reaction of this compound with a lower-alkylating agent, e.g., a lower-alkyl halide, in the presence of a strong base, e.g., potassium tertiary-butoxide, sodamide, etc., yields the compounds of Formula II where R' is lower-alkyl.

The compounds of Formula II where R' is hydrogen also can be prepared by the generally known method of heating the corresponding α-(lower-alkoxy)phenylacetamide of the formula phenyl-$CH(OR)CONH_2$ with a dehydrating agent effective to convert carboxamides to nitriles, e.g., thionyl chloride. Said α-(lower-alkoxy)phenylacetamides are prepared from the corresponding generally known α-(lower-alkoxy)phenylacetic acids by the generally known procedures of converting said acids to their acid chlorides by reaction with thionyl chloride and reacting said acid chlorides with ammonia to form said carboxamides.

PREPARATION OF FINAL PRODUCTS

The final products, as illustrated by Formula I, are prepared by heating a 2-(lower-alkoxy)-2-phenylalkanenitrile of Formula II with an alkanediamine of Formula III in the presence of a catalytic amount of carbon disulfide or hydrogen sulfide. This reaction is carried out by heating the reactants in the presence of the sulfide catalyst, preferably with stirring under an inert atmosphere, e.g., nitrogen, at about 70 to 200° C., preferably between about 90° and 150° C.

Alternatively, and less preferably, the final products can be prepared by heating the corresponding 2-(lower-alkoxy)-2-phenylalkanoic acid or lower-alkyl ester thereof, preferably methyl or ethyl ester, with said alkanediamine, e.g., 1,2-ethanediamine, 1,3-propanediamine or 1,4-butanediamine, generally at higher temperatures than used with the nitriles, i.e., about 140–200° C., preferably about 140–160° C.

The best mode contemplated for carrying out the invention will now be set forth as follows:

(A) ALDEHYDE DI-(LOWER-ALKYL) ACETALS (1) Benzaldehyde diethyl acetal.—A mixture containing 160 g. of benzaldehyde, 161 g. of triethyl orthoformate, 138 g. of ethanol and 2 g. of finely powdered ammonium chloride was refluxed on a steam bath for fifteen minutes; the excess reactants were then distilled off at about 85° C.; and the remaining material was distilled in vacuo. After a fore-run of ethyl orthoformate (B.P., 40–60° C. at 10 mm.), 160 g. of benzaldehyde diethyl acetal was collected at 97–99° C./10 mm.

(2) 1-naphthaldehyde dimethyl acetal.—To 134 g. of 1-naphthaldehyde in a one liter round bottom flask was added successively 120 g. of trimethyl orthoformate, 120 ml. of methanol and two drops of concentrated hydrochloric acid. After the initial vigorous reaction had subsided, the solution was refluxed for thirty minutes and then the excess reagents were removed by distilling under reduced pressure. The residue was distilled in vacuo to yield 160 g. of 1-naphthaldehyde dimethyl acetal, B.P. 94° C. at 0.12 mm.

(3) 2,6-dichlorobenzaldehyde diethyl acetal.—143 g., was prepared by stirring a mixture containing 100 g. of 2,6-dichlorobenzaldehyde, 90 g. of triethyl orthoformate, 90 ml. of ethanol and 0.5 ml. of concentrated hydrochloric acid for forty-five minutes at room temperature (25–30° C.), for forty-five minutes on a steam bath and one hour at room temperature, followed by removal of the excess reactants by distilling in vacuo at 70° C. using a water pump. The product was used in the next step without any further purification.

(4) 2-chlorobenzaldehyde diethyl acetal.—835 g., as a clear pale yellow oil, was prepared as in Example A–3 using 500 g. of 2-chlorobenzaldehyde, 634 g. of triethyl orthoformate, 625 ml. of ethanol and 1 ml. of concentrated hydrochloric acid.

(5) 4-chlorobenzaldehyde diethyl acetal.—168.5 g., B.P. 126–129° C. at 15 mm., was prepared by refluxing for thirty minutes a mixture containing 140.6 g. of 4-chlorobenzaldehyde, 178 g. of triethyl orthoformate, 175 ml. of ethanol and 1 ml. of concentrated hydrochloric acid; distilling off in vacuo (at 90° C. using a water pump) the solvent and excess reactants; and, distilling the residue under high vacuum.

(6) Indane-5-carboxaldehyde diethyl acetal.—281 g., B.P. 139–140° C. at 9 mm., was prepared as in Example A–5 using 200 g. of indane-5-carboxaldehyde, 244 g. of triethyl orthoformate, 200 ml. of absolute ethanol, 1 ml. of concentrated hydrochloric acid and a reflux period of one hour.

(7) 1-naphthaldehyde diethyl acetal.—197 g., B.P. 100–101° C. at 0.16–0.17 mm., was prepared as in Example A–2 using 156.2 g. of 1-naphthaldehyde, 196 g. of triethyl orthoformate, 150 ml. of ethanol and two drops of concentrated hydrochloric acid.

(8) 3-fluorobenzaldehyde diethyl acetal.—140.8 g. B.P. 91–95° C. at 1 mm., was prepared as in Example A–5 using 124 g. of 3-fluorobenzaldehyde, 163 g. of ethyl orthoformate, 175 ml. of absolute ethanol, three drops of concentrated hydrochloric acid and a reflux period of thirty minutes after the 3-fluorobenzaldehyde had been added in three equal portions with stirring to the other reactants.

(9) 4-isopropylbenzaldehyde diethyl acetal.—198.1 g., was prepared as in Example A–3 using 148 g. of 4-isopropylbenzaldehyde, 185 g. of triethyl orthoformate, 150 ml. of absolute ethanol, 2 ml. of concentrated hydrochloric acid and a reflux period of one hour after mixing the reactants.

(10) 4-methoxybenzaldehyde diethyl acetal.—422 g., was prepared as in Example A–9 using 242 ml. of 4-methoxybenzaldehyde (anisic aldehyde), 326 g. of triethyl orthoformate, 250 ml. of absolute ethanol and six drops of concentrated hydrochloric acid.

(11) Benzaldehyde dimethyl acetal.—146.2 g., B.P. 98–103° C. at 31–37 mm., was prepared as in Example A–5 using 106.1 g. of benzaldehyde, 127.5 g. of triethyl orthoformate, 96.1 g. of anhydrous methanol and one drop of concentrated hydrochloric acid.

(12) 4-methylbenzaldehyde diethyl acetal.—387 g., was prepared as in Example A–3 using 240 g. of 4-methylbenzaldehyde, 296 g. of triethyl orthoformate, 350 ml. of absolute ethanol and six drops of concentrated hydrochloric acid, allowing the reactants to stand for ten minutes after mixing before heating on a steam bath for about thirty minutes.

(13) 2-naphthaldehyde diethyl acetal.—102.4 g., B.P. 105–108° C. at 0.02 mm., was prepared as in Example A–5 using 90 g. of 2-naphthaldehyde, 121.5 g. of triethyl orthoformate, 90 ml. of absolute ethanol and two drops of concentrated hydrochloric acid, stirring the reactants for about thirty minutes and then refluxing for forty-five minutes.

(14) 3,4-dichlorobenzaldehyde diethyl acetal.—A mixture containing 175 g. of 3,4-dichlorobenzaldehyde, 178 g. of triethyl orthoformate, 100 ml. of absolute ethanol and 100 ml. of 5% ethanolic hydrogen chloride solution was stirred under reflux for thirty minutes. The reaction mixture was then cooled and neutralized with sodium ethoxide solution prepared from 2.3 g. of sodium and 100 ml. of absolute ethanol. The solvent was distilled off in vacuo; the residue was cooled in an ice bath and diluted with 300 ml. of benzene; and, the resulting mixture was poured into 200 ml. of cooled 10% aqueous sodium hydroxide solution. The benzene layer was separated, washed with 200 ml. of water, dried over anhydrous sodium sulfate, filtered through anhydrous sodium sulfate and heated on a steam bath in vacuo to remove any solvent. The residue was then distilled in vacuo to yield a 201.7 g. fraction of 3,4-dichlorobenzaldehyde diethyl acetal, B.P. 73–88° C. at 0.185–0.310 mm.

(15) Benzaldehyde di-n-propyl acetal.—A mixture containing 210 g. of benzaldehyde dimethyl acetal, 1 liter of n-propanol and 1 drop of concentrated hydrochloric acid was fractionally distilled through a 9″ column packed with glass helices. After removing the methanol at atmospheric pressure, then removing the excess n-propanol using a rotary evaporator, the product, benzaldehyde di-n-propyl acetal B.P. 242–245° C., was distilled at atmospheric pressure.

(16) Benzaldehyde di-n-butyl acetal.—247.3 g., B.P. 112–115° C. at 1.7 mm., was prepared using the procedure of Stewart et al. [JACS 77, 1098 (1955)] using 202 ml. of benzaldehyde, 600 ml. of n-butanol and two drops of concentrated hydrochloric acid.

(17) 2-methoxybenzaldehyde diethyl acetal.—105 g., was prepared as in Example A–3 using 65 g. of 2-methoxybenzaldehyde, 90 g. of triethyl orthoformate, 200 ml. of absolute ethanol and 1 ml. of concentrated hydrochloric acid.

(18) 4-benzyloxybenzaldehyde diethyl acetal.—To a suspension containing 100 g. of 4-benzyloxybenzaldehyde, 90 g. of triethyl orthoformate and 250 ml. of absolute ethanol was added 1 ml. of concentrated hydrochloric acid. After allowing the reaction mixture to stand for one hour at about 25–30° C., 30 g. of solid potassium carbonate was added and the resulting mixture was stirred for five minutes and filtered. The filtrate was evaporated in vacuo to yield 135 g. of 4-benzyloxybenzaldehyde diethyl acetal.

(19) 3-cyclohexenealdehyde diethyl acetal.—To a stirred solution containing 128.5 g. of 3-cyclohexenealdehyde (1,2,3,6-tetrahydrobenzaldehyde) and 250 ml. of absolute ethanol was added successively a few mg. of p-toluenesulfonic acid and 220 ml. of triethyl orthoformate, the latter at such a rate to maintain the reaction temperature at about 38° C. (aided by cooling in an ice bath). The reaction mixture was stirred at room temperature for seventeen hours, warmed on a steam bath to reflux (reaction temperature 78° C.) for two hours, cooled and distilled in vacuo to remove the ethanol and excess triethyl orthoformate. The remaining viscous yellow oily residue was dissolved in 500 ml. of ether and the solution extracted successively with 10% aqueous sodium hydroxide solution three times and then with water. The ether solution was then dried over anhydrous magnesium sulfate and the ether removed by distilling in vacuo, thereby yielding 208 g. of 3-cyclohexenealdehyde diethyl acetal.

(20) 3-fluoro-4-methoxybenzaldehyde diethyl acetal.— 192 g., was prepared as in Example A–3 using 122 g. of 3-fluoro-4-methoxybenzaldehyde, 170 g. of triethyl orthoformate, 200 ml. of absolute ethanol and three drops of concentrated hydrochloric acid.

(B) ALPHA-HALOBENZYL LOWER-ALKYL ETHERS (1) α-Chlorobenzyl ethyl ether.—A mixture containing 157 g. of benzaldehyde diethyl acetal, 180 g. of acetyl chloride and 1.5 ml. of thionyl chloride was stirred at room temperature (25–30° C.) overnight (about fifteen hours). The volatile liquids (excess acetyl chloride and ethyl acetate were removed under reduced pressure and the residue was fractionated in vacuo to yield 139.5 g. of α-chlorobenzyl ethyl ether, B.P. 58–60° C. at 0.2 mm.

(2) α,3,4-trichlorobenzyl ethyl ether.—218.2 g., was prepared as in Example B–1 using 229.5 g. of 3,4-dichlorobenzaldehyde diethyl acetal, 393 ml. of acetyl chloride and 3.5 ml. of thionyl chloride. The ether, not distilled, was obtained after removal of volatile liquids from the reaction mixture and heating the residue at 100° C. and 0.07 mm.

(3) 1-naphthylchloromethyl methyl ether.—A mixture containing 160 g. of 1-naphthaldehyde dimethyl acetal and 280 ml. of acetyl chloride in a flask equipped with a reflux condenser and a calcium chloride tube was allowed to stand at room temperature overnight. The excess acetyl chloride and the methyl acetate formed during the reaction were removed in vacuo at 30° C. to yield 160 g. of 1-naphthylchloromethyl methyl ether.

(4) α-Chlorobenzyl methyl ether.—131.7 g., was prepared as in Example B–3 using 146.2 g. of benzaldehyde dimethyl acetal and 408 ml. of acetyl chloride.

(5) α,4-dichlorobenzyl ethyl ether.—To a stirred mixture containing 280 ml. of acetyl chloride and 2 ml. of thionyl chloride was added dropwise at about 30° C. 168.5 g. of 4-chlorobenzaldehyde diethyl acetal over a period of about forty minutes. The reaction mixture was then allowed to stand overnight at room temperature. The solvent was removed in vacuo at a temperature below 40° C. and then the residue was heated in vacuo at 50° C. for about thirty minutes to yield 152 g. of α,4-dichlorobenzyl ethyl ether.

(6) α,2,6-trichlorobenzyl ethyl ether.—139 g., was prepared as in Example B–5 using 143 g. of 2,6-dichlorobenzaldehyde diethyl acetal, 200 ml. of acetyl chloride and 100 ml. of thionyl chloride. A 15 g. sample distilled at 82–83° C. at 0.06 mm.

(1) α,2-dichlorobenzyl ethyl ether.—826 g., was prepared as in Example B–5 using 835 g. of 2-chlorobenzaldehyde diethyl acetal, 1260 ml. of acetyl chloride and 2 ml. of thionyl chloride.

(8) α-Chloro-3-fluorobenzyl ethyl ether.—To 330 ml. of acetyl chloride containing 1 ml. of ethanol was added dropwise with stirring over a period of about one hour 184 g. of 3-fluorobenzaldehyde diethyl acetal, keeping the temperature between about 25–30° C. by intermittent cooling with and ice bath. The solution was allowed to stand overnight at room temperature and then heated in vacuo below 40° C. to remove the excess acetyl chloride and ethyl acetate. The residue was then heated in vacuo at 50° C. for an hour to yield 175 g. of α-chloro-3-fluorobenzyl ethyl ether.

(9) α-Chloro-4-methoxybenzyl ethyl ether.—401 g., was prepared as in Example B–8 using 422 g. of 4-methoxybenzaldehyde diethyl acetal, 357 ml. of acetyl chloride and 1 ml. of ethanol.

(10) α-Chloro-2-naphthylmethyl ethyl ether.—101 g., was prepared as in Example B—8 using 106 g. of 2-naphthaldehyde diethyl acetal and 82 ml. of acetyl chloride.

(11) α-Chloro-1-naphthylmethyl ether ether.—187 g. was prepared as in Example B–8 but using 2 ml. of thionyl chloride together with 350 ml. of acetyl chloride and 196.5 g. of 1-naphthaldehyde diethyl acetal.

(12) α-Chloro-4-isopropylbenzyl ethyl ether.—189 g. was prepared as in Example B–8 using 198 g. of 4-isopropylbenzaldehyde diethyl acetal, 160 ml. of acetyl chloride and 1 ml. of ethanol.

(13) α-Chlorobenzyl n-propyl ether.—92.4 g., was prepared as in Example B–8 using 104 g. of benzaldehyde di-n-propyl acetal and 178 ml. of acetyl chloride.

(14) α-Chlorobenzyl n-butyl ether.—198 g., was prepared in Example B–8 using 236 g. of benzaldehyde di-n-butyl acetal, 178 ml. of acetyl chloride and a few drops of ethanol.

(15) α-Chloro-4-methylbenzyl ethyl ether.—185 g., was prepared as in Example B–8 using 194 g. of 4-methylbenzaldehyde diethyl acetal, 284 ml. of acetyl chloride and 3 ml. of thionyl chloride.

(16) α-Chloro-5-indanylmethyl ethyl ether.—104 g., was prepared as in Example B–8 using 281 g. of indane-5-carboxaldehyde diethyl acetal and 400 ml. of acetyl chloride.

(17) α-Chloro-2-methoxybenzyl ethyl ether.—96 g. was prepared as in Example B–5 using 105 g. of 2-methoxybenzaldehyde diethyl acetal, 160 ml. of acetyl chloride and 1 ml. of thionyl chloride.

(18) 4-benzyloxy-α-chlorobenzyl ethyl ether was prepared as in Example B–8 using 135 g. of 4-benzyloxybenzaldehyde diethyl acetal, 106 ml. of acetyl chloride and 1 ml. of thionyl chloride.

(19) α-Chloro-1,2,3,6-tetrahydrobenzyl ethyl ether.—156 g., was prepared as in Examplre B–8 using 198 g. of 1,2,3,6-tetrahydrobenzaldehyde diethyl acetal, 700 ml. of acetyl chloride and 1 ml. of thionyl chloride.

(20) α-Chloro-3-fluoro-4-methoxybenzyl ether ether.—176 g., was prepared as in Example B–8 using 192 g. of 3-fluoro-4-methoxybenzyldehyde diethyl acetal, 500 g. of acetyl chloride and 1 ml. of thionyl chloride.

(C) ALPHA - (LOWER-ALKOXY)PHENYLACETONITRILES FROM ALPHAHALOBENZYL LOWER-ALKYL ETHERS (1) α-Ethoxphenylacetonitrile.—To a suspension containing 37.8 g. of sodium cyanide in 400 ml. of dimethylformamide was added dropwise with stirring over a period of about forty-five minutes, keeping the mixture below 30° C., a solution containing 105 g. of α-chlorobenzyl ethyl ether in 100 ml. of dimethylformamide. The mixture was stirred for an additional thirty minutes; the solids were filtered off; the solvent was distilled off under reduced pressure; and, the residue was fractionally distilled to yield 66 g. of α-ethoxyphenylacetonitrile, B.P. 114–116° C. at 10 mm.

(2) α - Ethoxy-2,6-dichlorophenylacetonitrile.—63 g., B.P. 97° C. at 0.05 mm., was prepared as in Example C–1 using 36 g. of sodium cyanide suspended in 250 ml. of dimethylformamide and 124 g. of α,2,6-dichlorobenzyl ethyl ether and 40 ml. of dimethylformamide. Before distillation, infusorial earth was added to the reaction mixture; the mixture was filtered; and the filter cake was washed with benzene; and, the filtrate was evaporated on a rotary evaporator, removing the last of the dimethylformamide through a fractionating column using a water pump.

(3) α - Ethoxy - 2 - chlorophenylacetonitrile.—To a stirred suspension containing 204 g. of sodium cyanide in 1500 ml. of dimethylformamide was added over a period of about two hours, keeping the reaction mixture at about 20–25° C., 676 g. of α,2-dichlorobenzyl ethyl ether and the resulting mixture was stirred for an additional hour. To the reaction mixture was added 800 ml. (dry volume) of infusorial earth and the mixture was filtered through infusorial earth. The filter pad was washed with benzene. The combined filtrate and washings were evaporated in vacuo at about 20–40 mm. and 70° C. The residue was taken up with 1500 ml. of 1:1 benzene-ether and the resulting solution treated with 2 liters of ice water containing 200 ml. of 10% aqueous sodium hydroxide solution. The aqueous layer was drained off and discarded. The organic layer was washed with two 500 ml. portions of water and with 250 ml. portions of brine, and then dried overnight over anhydrous sodium sulfate. The solvent was distilled off in vacuo and the residue fractionally distilled to yield 379.2 g. of α-ethoxy-2-chlorophenylacetonitrile, B.P. 93–97° C. at 1.4 mm.

(4) α-Ethoxy-4-chlorophenylacetonitrile.—88.5 g., B.P. 103–105° C. at 1.3 mm., was prepared as in Example C–2 using 49 g. of sodium cyanide in dimethylformamide and 152 g. of α,4-dichlorobenzyl ethyl ether.

(5) α-Methoxy-1-naphthylacetonitrile, 68 g., B.P. 124–126° C. at 0.27–0.28 mm., was prepared as in Example C–3 using 49 g. of sodium cyanide in 500 ml. of dimethylformamide and 160 g. of α-chloro-1-naphthylmethyl methyl ether in 250 ml. of dimethylformamide.

(6) α-Ethoxy-3,4 - dichlorophenylacetonitrile.—24.5 g. at 78–90° C. and 0.015–0.025 mm. and 14.9 g. at 100–108° C. and 0.05 mm., was prepared as in Example C–1 using 50.5 g. of sodium cyanide suspended in 545 ml. of dimethylformamide and 198.2 g. of α,3,4,-trichlorobenzyl ethyl ether in 140 ml. of dimethylformamide.

(7) α-Methoxyphenylacetonitrile.—55.5 g., B.P. 59–68.5 C. at 0.03–0.14 mm., was prepared as in Example C–1 using 51.5 g. of sodium cyanide in 553 ml. of dimethylformamide and 131. 7 g. of α-chlorobenzyl methyl ether in 141 ml. of dimethylformamide.

(8) α-n-propoxyphenylacetonitrile.—57.3 g., B.P. 100–103° C. at 2 mm., was prepared as in Example C–3 but using only ether (no benzene) to extract the product and using 30.6 g. of sodium cyanide in 200 ml. of dimethylformamide and 92.4 g. of α-chlorobenzyl n-propyl ether.

(9) α - n - butoxyphenylacetonitrile.—122.9 g., B.P. 105.5–107.5° C. at 1.5 mm., was prepared as in Example C–8 using 61.2 g. of sodium cyanide in 500 ml. of dimethylformamide and 198 g. of n-butyl α-chlorobenzyl ether.

(10) α-Ethoxy - 3 - fluorophenylacetonitrile.—54.6 g., B.P. 75–78° C. at 0.17 mm., was prepared as in Example C–8 using 57 g. of sodium cyanide in 600 ml. of dimethylformamide and 175 g. of α-chloro-3-fluorobenzyl ethyl ether.

(11) α-Ethoxy-4-methoxyphenylacetonitrile.—299.5 g., B.P. 118–125° C. at 1.5 mm., was prepared as in Example C–8 using 122.5 g. of sodium cyanide in 900 ml. of dimethylformamide and 401 g. of α-chloro-4-methoxybenzyl ethyl ether.

(12) α-Ethoxy - 2 - naphthylacetonitrile.—40.44 g., B.P. 119–121° C. at 0.09 mm., was prepared as in Example C–8 using 28.2 g. of sodium cyanide in 350 ml. of dimethylformamide and 101 g. of α-chloro-2-naphthylmethyl ethyl ether. The product solidified on standing and was found to melt at 52–54° C.

(13) α-Ethoxy - 4 - isopropylphenylacetonitrile.—109.6 g., B.P. 86–92° C. at 0.10 mm., was prepared as in Example C–8 using 55 g. of sodium cyanide in 400 ml. of dimethylformamide and 189 g. of α-chloro-4-isopropylbenzyl ethyl ether.

(14) α-Ethoxy - 1 - naphthylacetonitrile.—97.3 g., B.P. 135–139° C. at 0.09–0.12 mm., was prepared as in Example C–8 using 50 g. of sodium cyanide in 850 ml. of dimethylformamide and 182 g. of α-chloro-1-naphthylmethyl ethyl ether.

(15) α - Ethoxy - 4 - methylphenylacetonitrile.—89 g., 133–135° C. at 9 mm., was prepared as in Example C-8 using 61 g. of sodium cyanide in 300 ml. of dimethylformamide and 172 g. of α-chloro-4-methylbenzyl ethyl ether.

(16) α-Ethoxy - 5 - indanylacetonitrile.—104 g., B.P. 122–126° C. at 1.4 mm., was prepared as in Example C-8 using 78.5 g. of sodium cyanide in 650 ml. of dimethylformamide and 269.8 g. of α-chloro-5-indanylmethyl ethyl ether. Before fractionating, the reaction mixture was diluted with 1300 ml. of water, the mixture extracted three times with benzene, the extract washed with water, dried over anhydrous potassium carbonate and evaporated in vacuo to remove the benzene.

(17) α - Ethoxy - 2 - methoxyphenylacetonitrile.—B.P. 111–113° C. at 1.3 mm., was prepared as in Example C-8 using 30 g. of sodium cyanide in 250 ml. of dimethylformamide and 96 g. of α-chloro-2-methoxybenzyl ethyl ether.

(18) 4-benzyloxy - α - ethoxyphenylacetonitrile.—To a stirred mixture containing 30 g. of sodium cyanide in 250 ml. of dimethylformamide was added dropwise over a period of forty-five minutes 4-benzyloxy-α-chlorobenzyl ethyl ether prepared from 135 g. of 4-benzyloxybenzaldehyde diethyl acetal (Example B-18), maintaining the reaction temperature at about 20–25° C. by slight external cooling. The reaction mixture was stirred for an additional three hours, infusorial earth was added and the mixture filtered through infusorial earth. The filter cake was washed successively with dimethylformamide and benzene. The combined filtrate and washings were evaporated to a low volume and was taken up in a mixture of benzene, ether and water. The layers were separated and the organic layer was washed three times with water and then stirred vigorously for one hour with 100 ml. of 1 N hydrochloric acid. The layers were separated and the organic layer was washed with aqueous sodium bicarbonate solution, dried over anhydrous potassium carbonate while treating with decolorizing charcoal, the mixture filtered and the filtrate evaporated in vacuo to remove the ether and benzene. The residue was distilled under reduced pressure to yield 53.7 g. of 4-benzyloxy-α-ethoxyphenylacetonitrile, B.P. 155–158° C. at 0.03–0.04 mm.

(19) α - ethoxy - 3 - cyclohexenylacetonitrile.—13.6 g. B.P. 97–99° C., at 8 mm., was prepared as in Example C-3 using 23 g. of sodium cyanide, 400 ml. of dimethylformamide, 80 g. of α - chloro - 1,2,3,6 - tetrahydrobenzaldehyde ethyl ether and ether instead of benzeneether in the work-up.

(20) 3 - chloro - α - ethoxyphenylacetonitrile.—B.P. 89–91° C. at 0.14 mm., 67.11 g., was prepared as in Example C-8 using 53.9 g. of sodium cyanide, 300 ml. of dimethylformamide and 146 g. of α,3-dichlorobenzyl ethyl ether.

(21) α - ethoxy - 3 - fluoro - 4 - methoxyphenylacetonitrile.—B.P. 125–129° C. at 1.4 mm., 81.3 g., was prepared as in Example C-8 using 49 g. of sodium cyanide, 500 ml. of dimethylformamide and α - chloro - 3 - fluoro-4-methoxybenzyl ethyl ether.

Following the procedure described in Example C, e.g., C-1, C-3 or C-8 using corresponding molar equivalents of the appropriate α-halobenzyl lower-alkyl ether, the following α - (lower - alkoxy) phenylacetonitriles are prepared: 3 - fluoro - α - n - propoxyphenylacetonitrile using α - chloro - 3 - fluorobenzyl n-propyl ether; 2,4-dibromo-α - ethoxyphenylacetonitrile using 2,4 - dibromo - α - chlorobenzyl ethyl ether; α,3,4 - triethoxyphenylacetonitrile using α - chloro - 3,4 - diethoxybenzyl ethyl ether; α-ethoxy - 3 - diethylaminophenylacetonitrile using α-chloro - 3 - diethylaminobenzyl ethyl ether; α - n - butoxy-4-methylmercaptophenylacetonitrile using α - chloro - 4 - methylmercaptobenzyl n-butyl ether; α - ethoxy-4-methylsulfonylphenylacetonitrile using α - chloro - 4 - methylsulfonyl benzyl ethyl ether; α - ethoxy - 4 - biphenylylacetonitrile using α - chloro - 4 - biphenylylmethyl ethyl ether; 4 - chloro - α - n - hexoxyphenylacetonitrile using α,4 - dichlorobenzyl n-hexyl ether; α - ethoxy - 3 - fluoro-4 - methoxyphenylacetonitrile using α - chloro - 3 - fluoro-4-methoxybenzyl ethyl ether; 4 - chloro - α - ethoxy-2-nitrophenylacetonitrile using α,4 - dichloro - 2 - nitrobenzyl ethyl ether. The foregoing intermediate α - halobenzyl lower-alkyl ethers are prepared in two steps starting with the appropriate corresponding aldehyde and following the procedures described above in Example A, e.g., A–1, A–3, A–15 or A–16, and Example B, e.g., B–1, B–2, B–5 or B–8, first to form the corresponding aldehyde di - (lower - alkyl) acetals and then the corresponding α-halobenzyl lower-alkyl ethers.

(D) ALPHA-(LOWER-ALKOXY)PHENYLACETIC ACIDS, ESTERS AND AMIDES (1) α-methoxyphenylacetamide.—A solution of 30 g. of ethyl α-chlorophenylacetate in 100 ml. of 1.6 M methanolic sodium methylate was refluxed for three hours, the solvent stripped off and the residue partitioned between ether and cold dilute hydrochloric acid. Distillation of dried ether solution yielded 16 g. of ethyl α-methoxyphenylacetate, B.P. 130–132° C. at 19 mm. This ester was dissolved in 300 ml. of methanol which previously had been saturated with ammonia and the solution was allowed to remain at room temperature for three days. The solvent was removed and the residue recrystallized from benzene to yield 7.5 g. of α-methoxyphenylacetamide, M.P. 111–112° C.

(2) α-methoxyphenylacetamide.—To a stirred solution containing 53.5 g. of benzaldehyde, 89.5 g. of chloroform and 100 ml. of methanol, maintained at 40–45° C., there was added dropwise a solution of 165 g. of potassium hydroxide in 400 ml. of methanol. After standing at room temperature for fourteen hours, the reaction mixture was stripped of solvent and the residual material was dissolved in water. The aqueous solution was filtered through decolorizing charcoal, and the filtrate was acidified and extracted with ether. Distillation of dried ether solution yielded 44 g. of α-methoxyphenylacetic acid, B.P. 130–134° C. at 0.7 mm. and M.P. 68–70° C. after recrystallizing from benzenepetroleum ether. Thirty grams of α-methoxyphenylacetic acid was added to a mixture of 30 ml. of thionyl chloride and 100 ml. of chloroform, and the mixture was refluxed for eight hours. The volatile liquids were removed by distilling in vacuo and the residue was dissolved in a small amount of acetone. The acetone solution was added slowly to ammonium hydroxide containing ice. The reaction mixture was distilled in vacuo and the remaining dry residue was recrystallized from aqueous isopropyl alcohol using decolorizing charcoal to yield 15.8 g. of α-methoxyphenylacetamide, M.P. 109–111° C.

(3) α - methoxy - α - 3 - trifluoromethylphenylacetamide.—A solution of 10.4 g. of 3-trifluoromethylbenzaldehyde and 17.2 g. of bromoform in 50 ml. of methanol was stirred at 0–5° C. while a solution of 18 g. of potassium hydroxide in 100 ml. of methanol was added over a period of 90 minutes. The mixture was allowed to remain overnight in a melting ice bath and then most of the alcohol was removed by ether extraction and the solution acidified. The precipitated oily material was extracted and distilled to yield 8 g. of α - methoxy - 3 - trifluoromethylphenylacetic acid, B.P. 120–122° C. at 0.4 mm. This acid was converted into its acid chloride by refluxing a solution of 12 g. of the acid in 25 ml. of thionyl chloride for two hours and removing the excess thionyl chloride by vacuum-distillation. The acid chloride was added slowly to ammonium hydroxide containing ice and the semi-solid amide was collected and recrystallized twice from benzenepetroleum ether to yield 4.5 g. of α-methoxy - 3 - trifluoromethylphenylacetamide, M.P. 96–97° C.

(4) α - n - butoxyphenylacetamide.—To a stirred solution of 32.4 g. of benzaldehyde, 81 g. of bromoform and 100 ml. of n-butanol kept at about 5–10° C. was added dropwise a solution prepared by reacting 34.5 g. of sodium with 700 ml. of n-butanol. After remaining overnight, the mixture was distilled to dryness and the residue taken up in water. The aqueous solution was clarified by ether extract, acidified and the precipitated oily acid was extracted with ether and fractionated to yield 14.1 g. of α-n-butoxyphenylacetic acid, B.P. 130–132° C. at 0.4 mm. This acid (14 g.) was combined with 25 ml. thionyl chloride and 50 ml. of benzene and refluxed for two hours. The solvent was removed and the residue was added to iced ammonium hydroxide to yield 7 g. of α-n-butoxyphenylacetamide, M.P. 84–85° C., after recrystallization from n-heptane.

(5) 4-chloro - α - methoxyphenylacetamide, M.P. 133–134° C., was prepared in 37% yield as in Example D–3 using corresponding molar equivalent quantities of 4-chlorobenzaldehyde, bromoform and methanol to form 4-chloro-α-methoxyphenylacetic acid, B.P. 148–149° C. at 0.5 mm. and M.P. 82–84° C. and converting the acid to its acid chloride using thionyl chloride and reacting the acid with ammonia to yield the amide.

(6) α-Ethoxyphenylacetamide.—B.P. 140–144° C. at 0.4 mm. and M.P. 72–74° C. after recrystallization from n-heptane, was obtained as in Example D–2 first using corresponding molar equivalent quantities of benzaldehyde, chloroform and ethanol in the presence of potassium hydroxide to give a 37% yield of α-ethoxyphenylacetic acid, B.P. 137–179° C. at 0.7 mm.; and then successively converting the acid to its acid chloride with thionyl chloride and then to its amide with ammonia.

(7) α-Methoxy-4-biphenylylacetic acid.—To a stirred suspension of 25 g. of 4-biphenylcarboxaldehyde, 37.8 g. of bromoform and 150 ml. of methanol stirred at 0–5° C. was added dropwise a solution of 48 g. of 85% potassium hydroxide in 230 ml. of methanol. About one-half of the potassium hydroxide-methanol solution was added over a thirty minute period and the remainder was added more rapidly over a fifteen minute period. The reaction mixture was stirred in a melting ice bath for about twenty hours and evaporated in vacuo to remove the methanol and water. The residue was taken up with a mixture of ethyl acetate and water. The aqueous layer was separated and acidified. The acidic solution was extracted with chloroform and the remaining acidic solution evaporated in vacuo. The remaining solid residue was crystallized first from benzene and then from isopropyl alcohol to yield 13.6 g. of α-methoxy-4-biphenylylacetic acid, M.P. 130.5–133° C.

(E) ALPHA - (LOWER - ALKOXY)PHENYLACETONITRILES FROM ALPHA - (LOWER - ALKOXY)-PHENYLACETAMIDES (1) α-Methoxyphenylacetonitrile.—A solution of 7.5 g. of α-methoxy-α-phenylacetamide in 30 ml. of thionyl chloride was refluxed for two hours and distilled to yield 3.9 g. of α-methoxy-α-phenylacetonitrile, B.P. 120–123° C. at 19 mm.

(2) α - Methoxy-3-trifluoromethylphenylacetonitrile.—2.5 g., B.P. 115–120° C. at 17 mm., was prepared as in Example E–1 using 4 g. of α-methoxy-3-trifluoromethylphenylacetamide and 20 ml. of thionyl chloride.

(3) α-n-butoxyphenylacetonitrile.—4.9 g., B.P. 146–148° C. at 16 mm., was prepared as in Example E–1 using 7 g. of α-n-butoxy-α-phenylacetamide and 20 ml. of thionyl chloride.

(4) 4 - chloro-α-methoxyphenylacetonitrile.—B.P. 99–103° C. at 0.7 mm., was prepared in 59% yield by dehydration of α-methoxy-α-4-chlorophenylacetamide by heating it with thionyl chloride in benzene until the theoretical quantity of water was removed.

(5) α-Ethoxyphenylacetonitrile.—B.P. 101–106° C. at 0.4 mm., was prepared as in Example E–4 in 73% yield by heating α-ethoxyphenylacetamide with thionyl chloride in benzene.

(F) OTHER 2-(LOWER-ALKOXY)-2-PHENYLALKANENITRILES (1) 2-ethoxy-2-phenylbutanenitrile.—To a stirred solution of 32.2 g. of α-ethoxyphenylacetonitrile in 100 ml. of tetrahydrofuran, kept at about 5–10° C. using an ice bath, was added dropwise under nitrogen 27 g. of potassium tertiary-butoxide as a 10% w./v. solution in tetrahydrofuran. After the addition, which took thirty minutes, the reaction mixture was stirred an additional fifteen minutes in ice; the ice bath was removed and the mixture stirred an additional fifteen minutes. To the reaction mixture kept at about 15–20° C. was added dropwise over a period of about fifteen minutes 39 g. of ethyl iodide. The ice bath was removed and the reaction mixture stirred for forty-five minutes. Then enough glacial acetic acid was added until the reaction mixture was no longer basic to wet pH paper (about 0.5 ml.). The mixture was then filtered through sintered glass and the residual salts thoroughly washed with ether. The combined washings and filtrate were distilled in vacuo to yield 23.8 g. of 2 - ethoxy - 2 - phenylbutanenitrile, B.P. 113–114° C. at 12 mm.

(2) 2 - (4 - chlorophenyl)-2-ethoxybutanenitrile.—B.P. 128–129° C. at 9 mm., 22.3 g., was prepared as in Example F–1 by first adding a solution of 39.0 g. of 4-chloro-α-ethoxyphenylacetonitrile in 30 ml. of tetrahydrofuran dropwise over a period of forty-five minutes to a solution containing 28.0 g. of potassium tertiary-butoxide in 200 ml. of tetrahydrofuran, maintaining the mixture at about 5–10° C.; stirring the mixture with cooling for another hour; then adding dropwise over a period of about thirty minutes to the stirred solution cooled to about 10° C. a solution of 42.1 g. of ethyl iodide in 20 ml. of tetrahydrofuran; and working up the reaction mixture as in Example F–1.

Following the procedure described above in Example F–1 and using corresponding molar equivalent quantities of the appropriate α-(lower-alkoxy)phenylacetonitrile and lower-alkyl or lower-alkenyl halide, the following 2-(lower - alkoxy) - 2 - phenylalkanenitriles are obtained: 2-ethoxy - 2 - phenylpropanenitrile using α-ethoxyphenylacetonitrile and methyl iodide; 2-(4-chlorophenyl)-2-ethoxypentanenitrile using 4-chloro-α-ethoxyphenylacetonitrile and n-propyl iodide; 2-(3-chlorophenyl)-2-ethoxyhexanenitrile using 3-chloro - α - ethoxyphenylacetonitrile and n-butyl bromide; 2 - ethoxy - 2 - phenyloctanenitrile using α-ethoxyphenylacetonitrile and n-hexyl bromide; and, 2-ethoxy - 2 - (3-fluorophenyl)-4-pentenenitrile using α-ethoxy-3-fluorophenylacetonitrile and allyl bromide.

(G) 2-[ALPHA-(LOWER-ALKOXY)-BENZYL]-2-IMIDAZOLINES (1) 2-(α-ethoxybenzyl)-2-imidazoline.—To a mixture containing 16.1 g. of α-ethoxyphenylacetonitrile and 7.2 g. of ethylenediamine (1,2-ethanediamine) was added five drops of carbon disulfide and the reaction mixture was heated at 95–99° C. for six hours and then allowed to cool whereupon the reaction mixture solidified. The reaction mixture was taken up with benzene-isopropyl alcohol (5:1 v./v.). The resulting solution was filtered, the filtrate concentrated and n-hexane added to cloudiness. The solution was allowed to cool to room temperature and the walls of the glass container scratched with a glass rod. The resulting crystalline precipitate was collected and recrystallized once from benzene and once from methylene chloride-ether to yield 7.5 g. of 2-(α-ethoxybenzyl)-2-imidazoline, M.P. 123.0–125.4° C. (corr.).

(2) 2-(α - ethoxybenzyl)-5-methyl-2-imidazoline.—6.6 g., M.P. 102.0–105.6° C. (corr.), was prepared as in Example G–1 using 16.1 g. of α-ethoxyphenylacetonitrile, 8.9 g. of 1,2-propanediamine and five drops of carbon disulfide, and recrystallizing once from benzene-n-hexane and once from methylene chloride-n-hexane.

(3) 2-(2,6 - dichloro-α-ethoxybenzyl)-2-imidazoline.—To a mixture containing 11.5 g. of 2,6-dichlorophenyl-α-ethoxyacetonitrile and 6 g. of ethylenediamine was added three drops of carbon disulfide and resulting mixture was heated with stirring under an atmosphere of nitrogen at about 130–135° C. for eighteen hours. The reaction mixture was taken up with a mixture of benzene and water; the benzene layer was separated, washed three times with water and then extracted with three 50 ml. portions of 2 N hydrogen chloride. The acidic solution was washed with ether and then made basic with 35% aqueous sodium hydroxide solution. The separated solid was extracted with benzene and the benzene removed by distilling in vacuo. The resulting solid was dissolved in hot tetrahydrofuran, the hot solution treated with decolorizing charcoal and filtered, and the filtrate concentrated and n-hexane added to the concentrate. The solution was allowed to cool and the resulting precipitate was collected to yield 7.5 g. of 2-(2,6-dichloro-α-ethoxybenzyl)-2-imidazoline, M.P. 104–107° C.

(4) 2-(2 - chloro-α-ethoxybenzyl)-2-imidazoline.—12.2 g., M.P. 84–87° C., was prepared as in Example G–3 using 19.6 g. of 2-chloro-α-ethoxyphenylacetonitrile, 8 g. of ethylenediamine, three drops of carbon disulfide and a heating period of twelve hours on a steam bath. In the work-up, the reaction mixture was taken up with 1:1 (v./v.) benzene-ether and water, and the aqueous layer was extracted with ether. The combined organic extracts were washed with brine and extracted three times with 2 N hydrogen chloride. The acidic extract was extracted with ether and then made strongly basic with 35% aqueous sodium hydroxide solution. The basic mixture was extracted three times with ether. The ether extract was washed with brine, dried over anhydrous potassium carbonate and evaporated to yield a solid, which recrystallized from benzene-n-hexane and dried at 40° C. in vacuo to yield said product.

(5) 2-(3,4 - dichloro - α - ethoxybenzyl)-4,4(or 5,5)-dimethyl-2-imidazoline.—To a mixture containing 23.0 g. of 3,4-dichlorophenyl-α-ethoxyacetonitrile and 10.6 g. of 2-methyl-1,2-propanediamine was added five drops of carbon disulfide and the resulting mixture was heated under an atmosphere of nitrogen at 140° C. for about eighteen hours. The reaction mixture was allowed to cool and was poured into benzene. The solution was washed with water and then extracted with 6 N hydrogen chloride. The acidic extract was made strongly basic with 35% aqueous sodium hydroxide solution, while cooling, and the separated basic product was extracted with ether. The ether solution was washed successively with water and brine, dried over anhydrous magnesium sulfate and then concentrated in vacuo to yield a solid. The solid was dissolved in boiling n-hexane. The hexane solution was treated with decolorizing charcoal, filtered, concentrated to a volume of about 200 ml. and allowed to cool. The separated solid was collected, washed with n-hexane and dried at 60° C. for about twenty-six hours. There was thus obtained 18.2 g. of 2-(3,4-dichloro-α-ethoxybenzyl)-4,4(or 5,5)-dimethyl-2-imidazoline, M.P. 111–114° C.

(6) 2-(α-n-propoxybenzyl)-2-imidazoline.—A mixture containing 17.5 g. of α-n-propoxyphenylacetonitrile, 7.2 g. of ethylenediamine and five drops of carbon disulfide was heated at 140° C. for two and one-half hours under an atmosphere of nitrogen and allowed to cool whereupon the mixture solidified. The solid was dissolved in ethyl acetate and the resulting solution was washed free of ethylenediamine with water and then extracted with 1:1 (v./v.) hydrochloric acid. The acidic solution was made strongly basic with 35% aqueous sodium hydroxide solution and the liberated basic product was taken up in ethyl acetate. The ethyl acetate solution was washed successively with water and brine, dried over anhydrous magnesium sulfate and evaporated in vacuo to remove the solvent. The remaining solid was recrystallized from ether using decolorizing charcoal and dried in vacuo at 60° C. for eighteen hours to yield 14.0 g. of 2-(α-n-propoxybenzyl)-2-imidazoline, M.P. 82–84° C.

(7) 2-(α-methoxybenzyl)-imidazoline.—8.1 g., 79–80° C., was prepared as in Example G–2 using 14.7 g. of α-methoxyphenylacetonitrile, 7.2 g. of ethylenediamine, five drops of carbon disulfide, a heating period of twelve hours on a steam bath and two recrystallizations from methylene chloride-n-hexane.

(7a) 2 - (α - methoxybenzyl) - 2 - imidazoline.—A mixture containing 3.9 g. of α-methoxyphenylacetonitrile, 1.6 g. of 95% ethylenediamine and approximately 0.3 g. of hydrogen sulfide was heated at 110–115° C. until the evolution of ammonia had ceased (forty-five minutes). The reaction mixture was allowed to cool and treated with dilute aqueous hydrochloric acid; decolorizing charcoal was added and the mixture filtered. The filtrate was made alkaline with aqueous sodium hydroxide solution and extracted with ether. The ether extract was distilled in vacuo to yield 1.9 g. of 2-(α-methoxybenzyl)-2-imidazoline, B.P. 114–117° C. at 0.25 mm.

(8) 2 - (3,4 - dichloro - α - ethoxybenzyl) - 2 - imidazoline.—6.4 g., M.P. 75–76° C., was repeated as in Example G–1 using 14.9 g. of 3,4-dichloro-α-ethoxyphenylacetonitrile, 4.7 g. of ethylenediamine, four drops of carbon disulfide, a heating period of six hours at about 100° C., four recrystallizations from benzene-n-hexane using decolorizing charcoal the last time and drying in vacuo at 40° C. for several days.

(9) 2 - [α - ethoxy - (1 - naphthyl)methyl] - 4,4(or 5,5)-dimethyl-2-imidazoline.—10.6 g., M.P. 91–93° C., was prepared as in Example G–3 using 21 g. of α-ethoxy-1-naphthylacetonitrile, 10.6 g. of 2-methyl-1,2-propanediamine, five drops of carbon disulfide, a heating period of twenty-four hours, at 140° C., three recrystallizations n-hexane using decolorizing charcoal and drying in vacuo overnight at 60° C.

(10) 2 - [α - methoxy - (1 - naphthyl)methyl] - 2 - imidazoline.—A mixture containing 9.8 g. of α-methoxy-1-naphthylacetonitrile, 3.6 g. of ethylenediamine and three drops of carbon disulfide was heated on a steam bath for about fifteen hours. The reaction mixture was allowed to cool to room temperature and then dissolved in isopropyl acetate. The isopropyl acetate solution was kept overnight at 0° C., and the resulting crystalline precipitate was collected and the mother liquor was saved. The crystalline precipitate was dried at 60° C. in vacuo for two days to yield 3 g. of 2-[α-methoxy-(1-naphthyl)methyl]-2-imidazoline, M.P. 85–86° C. A small sample of said crystalline product was treated with a solution of hydrogen chloride and ether followed by evaporation of solvent and trituration with acetonitrile whereupon there were obtained crystals of 2-[α-methoxy-(1-naphthyl)methyl]-2-imidazoline hydrochloride. The above mother liquor was then treated with ethereal hydrogen chloride and evaporated in vacuo. The remaining residue was taken up with 125 ml. of boiling acetonitrile and the hot solution filtered. The filtrate was concentrated and seeded while hot with said crystalline 2-[α-methoxy-(1-naphthyl)methyl]-2-imidazoline hydrochloride and then allowed to cool to room temperature. The resulting crystalline product was collected, washed with acetonitrile and then recrystallized by dissolving it in 40 ml. of boiling isopropyl alcohol, adding decolorizing charcoal, filtering while hot, concentrating the filtrate and then adding acetone until crystallization starts. The mixture was allowed to cool and the crystalline product that separated was collected and dried in vacuo at 60° C. to yield 3.5 g. of 2-[α-methoxy - (1 - naphthyl)methyl] - 2 - imidazoline hydrochloride M.P. 235–237° C.

(11) 2 - (α - ethoxybenzyl) - 4,4(or 5,5) - dimethyl-2-imidazoline.—4.7 g., M.P. 73° C., was prepared as in Example G–3 using 16.1 g. of α-ethoxyphenylacetonitrile, 12 ml. of 2-methyl-1,2-propanediamine, five drops of carbon disulfide and a heating period of eighteen hours at 130° C. with stirring. The reaction mixture was taken up with chloroform rather than benzene; the product was triturated twice with n-pentane rather than recrystallizing it and was dried at 0.1 mm. at room temperature over phosphorus pentoxide.

(12) 2 - α - methoxy - 3 - trifluoromethylbenzyl) - 2-imidazoline.—Into a mixture containing 3.7 g. of α-methoxy - 3 - trifluoromethylphenylacetonitrile and 1.2 g. of ethylenediamine was bubbled briefly hydrogen sulfide and the mixture was then heated at 100–110° C. for thirty minutes. Fractionation yielded 2.6 g. of 2-(α-methoxy - 3 - trifluoromethylbenzyl) - 2 - imidazoline, B.P. 117–119° C. at 0.35 mm. An ether solution of the base treated with hydrogen chloride yielded 2-(α-methoxy-3 - trifluoromethylbenzyl) - 2 - imidazoline hydrochloride, M.P. 206–208° C., after recrystallization from isopropyl alcohol-ether.

(13) 2 - (4 - chloro - α - methoxybenzyl) - 2 - imidazolidine.—As its hydrochloride, M.P. 194–195° C., was prepared as in Example G–7a using corresponding molar equivalent quantities of α-methoxy-4-chlorophenylacetonitrile, ethylenediamine and hydrogen sulfide.

(14) 2 - (α - n - butoxybenzyl) - 2 - imidazoline.—As its hydrochloride, 2.5 g., M.P. 161–162° C. after recrystallization from isopropyl alcohol-ether, was prepared as in Example G–12 using 4.8 g. of α-n-butoxyphenylacetonitrile, 1.6 g. of ethylenediamine, a small quantity of hydrogen sulfide and a heating period of 110–115° C. for twenty-five minutes. The compound in free base form melted at 80–83° C. after recrystallization from n-heptane.

(15) 2 - (α - ethoxybenzyl) - 1 - methyl - 2 - imidazoline.—B.P. 106–110° C. at 0.3 mm., was prepared as in Example G–12 using corresponding molar equivalent quantities of α-ethoxyphenylacetonitrile, N-methylethylenediamine and hydrogen sulfide.

(16) 1 - n - butyl - 2 - (α - ethoxybenzyl) - 2 - imidazoline.—16.0 g., B.P. 100–110° C. at 0.025 mm., was obtained as in Example G–3 using 16.1 g. of α-ethoxyphenylacetonitrile, 17.4 g. of N-n-butylenediamine, four drops of carbon disulfide and a heating period of forty-eight hours at 140° C.

(17) 2-(α-ethoxy-2-methoxybenzyl)-2-imidazoline.—A mixture containing 10.0 g. of α-ethoxy-2-methoxyphenylacetonitrile, 8 g. of ethylenediamine and four drops of carbon disulfide was heated at 120° C. for sixteen hours. The excess diamine was removed by heating the reaction mixture at 100° C. and 30 mm. for one hour. The residue was taken up in ether and filtered. The ether solution was extracted with three 25 ml. portions of 2 N hydrogen chloride and once with brine. The combined aqueous extracts including the brine were made basic with 35% aqueous sodium hydroxide solution while cooling in an ice bath and the resulting mixture was extracted three times with chloroform. The chloroform extract was dried over anhydrous potassium carbonate, treated with decolorizing charcoal and filtered. The filtrate was evaporated to remove the chloroform thereby yielding 10.5 g. of 2-(α-ethoxy-2-methoxybenzyl)-2-imidazoline. The latter compound was mixed with 45 ml. of 1.0 M phosphoric acid in absolute ethanol and the resulting mixture was evaporated. 2-propanol was added and evaporated off to leave a crystalline product which was recrystallized from 100 ml. of absolute ethanol using decolorizing charcoal to yield 8.4 g. of 2-(α-ethoxy-2-methoxybenzyl)-2-imidazoline phosphate M.P. 184–186° C.

(18) 2-(α-ethoxy - α - ethylbenzyl)-2-imidazole.—M.P. 97–98° C., 4.5 g., was prepared as in Example G–3 using 9.0 g. of 2-ethoxy-2-phenylbutanenitrile, 5.0 g. of ethylenediamine, six drops of carbon disulfide and an initial heating period of five hours at 150° C. with stirring. Additional portions of ethylenediamine totaling 3.5 g. were periodically added to the reaction mixture which was heated an additional one-hundred and ten hours at 130–150° C. The reaction mixture was worked up as in Example G–3.

Following the procedure described in Example G, e.g., G–3, G–5 or G–6, using corresponding molar equivalent quantities of the appropriate α-(lower-alkoxy)phenylacetonitrile or 2-(lower-alkoxy)-2-phenylalkanenitrile and 1,2-alkanediamine, the following 2-[α-(lower-alkoxy)benzyl]-2-imidazolines are obtained:

2-(3-fluoro-α-n-propoxybenzyl)-4,4( or 5,5)-dimethyl-2-imidazoline using α-ethoxy-3-fluorophenylacetonitrile and 1-methyl-1,2-propanediamine;

2-(α-ethoxy - 4 - isopropylbenzyl) - 1 - ethyl-2-imidazoline using α-ethoxy-4-isopropylphenylacetonitrile and N-ethylethylenediamine;

2-[α-ethyl-α-5-indanylmethyl]-1,4,5-trimethyl-2-imidazoline using α-ethoxy-5-indanyl-acetonitrile and N-methyl-2,3-butanediamine;

1-n-butyl-2-(α-ethoxy-4-methoxybenzyl)-4,4(or 5 5)-dimethyl-2-imidazoline using α-ethoxy-4-methoxyphenylacetonitrile and N'-butyl-2-methyl-1,2-propanediamine;

2-(2,4-dibromo-α-ethoxybenzyl)-N,4,4-trimethyl-2-imidazoline using 2,4-dibromo-α-ethoxyphenylacetonitrile and N',2-dimethyl-1,2-propanediamine;

2-(α,3,4-triethoxybenzyl)-1-methyl-2-imidazoline using α,3,4-triethoxyphenylacetonitrile and N-methylethylenediamine;

4-ethyl-2-(α-ethoxy-3 - diethylaminobenzyl)-1-isopropyl-4-methyl - 2 - imidazoline using α-ethoxy-3-diethylaminophenylacetonitrile and N'-isopropyl-2-methyl-1,2-butanediamine;

2-(α-ethoxy-3-fluorobenzyl)-4,4,5,5-tetramethyl-2-imidazoline using α-ethoxy-3-fluorophenylacetonitrile and 2,3-dimethyl-2,3-butanediamine;

2-(α-ethoxy-4-ethylbenzyl)-5-ethyl-1,5-dimethyl-2-imidazoline using α-ethoxy-4-ethylphenylacetonitrile and N'-2-dimethyl-1,2-dibutanediamine;

2-(α-n-butoxy-4-methylmercaptobenzyl)-2-imidazoline using α-n-butoxy-4-methylmercaptophenylacetonitrile and ethylenediamine;

2-(α-ethoxy-4-methylsulfonylbenzyl)-1,4-diethyl-2-imidazoline using α-ethoxy-4-methylsulfonylphenylacetonitrile and N'-ethyl-1,2-butanediamine;

2-[α-(4-biphenylyl-α-ethoxy)-methyl[-2-imidazoline using α-ethoxy-4-biphenylylacetonitrile and ethylenediamine;

2-(4-chloro-α-n-hexoxybenzyl)-2-imidazoline using 4-chloro-α-n-hexoxyphenylacetonitrile and ethylenediamine;

2-(α-ethoxy-α-ethylbenzyl)-2-imidazoline using 2-ethoxy-2-phenylbutanenitrile and ethylenediamine;

2-(α-allyl-α-ethoxy-3-fluorobenzyl)-2-imidazoline using 2-ethoxy-2-(3-fluorophenyl)-4-pentenenitrile and ethylenediamine; and, 2-(α-ethoxy-α-n-hexylbenzyl) - 2 - imidazoline using 2-ethoxy-2-phenyloctanenitrile and ethylenediamine.

(H) 2-[ALPHA-(LOWER-ALKOXY)-BENZYL]-1,4,5,6-TETRAHYDROPYRIMIDINES (1) 2-(α-ethoxybenzyl) - 1,4,5,6 - tetrahydropyrimidine.—To a mixture containing 16.1 g. of α-ethoxyphenylacetonitrile and 8.9 g. of 1,3-propanediamine was added with swirling five drops of carbon disulfide. The resulting reaction mixture was heated on a steam bath with stirring for six hours and then allowed to stand at room temperature overnight (about fifteen hours), whereupon solidification resulted. The solid was taken up in benzene and the benzene solution filtered. The filtrate was concentrated and to it was added n-hexane. The resulting crystalline precipitate was collected, recrystallized from methylene chloride-n-hexane, washed with n-hexane and dried at 50° C. and 20 mm. to yield 12.1 g. of 2-(α-ethoxybenzyl)-1,4,5,6-tetrahydropyrimidine, M.P. 101.4–103.6° C. (corr.). 2-(α-ethoxybenzyl)-1,4,5,6-tetrahydropyrimidine hydrochloride, M.P. 143–147° C., was prepared by treating a chilled solution of 2-(α-ethoxybenzyl)-1,4,5,6-tetrahydropyrimidine in methanol with a solution of hydrogen chloride in isopropyl alcohol, evaporating off the solvent, recrystallizing the residue from acetone and drying the resulting salt at 60° C. in vacuo.

(2) 2-[α-methoxy-(1-naphthyl)methyl]-1,4,5,6-tetrahydropyrimidine.—4.7 g., M.P. 102.5–103.5° C., was prepared as in Example H–1 using 9.8 g. of α-methoxy-1-naphthylacetonitrile, 8.9 g. of 1,3-propanediamine, four drops of carbon disulfide, a heating period of twenty-four hours and successive recrystallizations from isopropyl acetate and tetrahydrofuran-isopropyl acetate.

(3) 2-(4-chloro-α-ethoxybenzyl) - 1,4,5,6 - tetrahydropyrimidine.—21 g., M.P. 93–96° C., was prepared as in Example H–1 using 39.1 g. of 4-chloro-α-ethoxyphenylacetonitrile, 17.8 g. of 1,3-propanediamine, six drops of carbon disulfide and recrystallization from benzene-n-hexane.

(4) 2-(2,6-dichloro - α - ethoxybenzyl)-1,4,5,6-tetrahydropyrimidine, 3.5 g., M.P. 120–123° C., was prepared as in Example H–1 using 17.9 g. of 2,6-dichloro-α-ethoxyphenylacetonitrile, 7 g. of 1,3-propanediamine, four drops of carbon disulfide and the following work-up of the reaction mixture. The solid reaction mixture was taken up in a 1 to 1 mixture (v./v.) of ether-benzene plus some water. The organic layer was separated, washed three times with water and then extracted with 2 N aqueous hydrogen chloride. The acidic solution was washed with ether, mixed with ice and made basic with 10% aqueous sodium hydroxide solution. The crystalline precipitate was taken up in benzene, the benzene solution dried over anhydrous potassium carbonate and then concentrated in vacuo followed by addition of n-hexane. The resulting crystalline product was collected and dried in vacuo at 60° C.

(5) 2-[α-ethoxy-(1 - naphthyl)methyl] - 1,4,5,6 - tetrahydropyrimidine, 17.2 g., M.P., 101–103° C., was prepared as in Example H–4 using 25.2 g. of α-ethoxy-1-naphthylacetonitrile, 10.8 g. of 1,3-propanediamine, seven drops of carbon disulfide and a reflux period of three hours. In the work-up, chloroform was used instead of ether-benzene and the product was recrystallized from n-hexane. 2-[α-ethoxy-(1-naphthyl)methyl] - 1,4,5,6 - tetrahydropyrimidine hydrochloride, M.P. 227–229° C., was prepared by treating an anhydrous ether solution of the basic compound with an excess of anhydrous ethereal hydrogen chloride, recrystallizing the salt twice from acetonitrile using decolorizing charcoal and drying it in vacuo at 75° C. for eighteen hours.

(6) 2-(α - ethoxy - 3 - fluorobenzyl)-1,4,5,6-tetrahydropyrimidine.—13.9 g., M.P. 92–94° C., was prepared as in Example H–1 using 17.9 g. of α-ethoxy-3-fluorophenylacetonitrile, 9.0 g. of 1,3-propanediamine, three drops of carbon disulfide, a heating period of two and one-half hours at 140° C. under an atmosphere of nitrogen and recrystallization from ether using decolorizing charcoal.

(7) 2-(2 - chloro - α - ethoxybenzyl)-1,4,5,6-tetrahydropyrimidine.—11.9 g., M.P. 101–104° C., was prepared in Example H–5 using 19.6 g. 2-chloro-α-ethoxyphenylacetonitrile, 10 g. of 1,3-propanediamine, three drops of carbon disulfide, a heating period of twelve hours on a steam bath, ether in the work-up and recrystallization from benzene-n-hexane.

(8) 2-(α-ethoxy - 4 - methylbenzyl)-1,4,5,6-tetrahydropyrimidine.—8.5 g., M.P. 72–73° C., was prepared as in Example H–5 using 17.5 g. of α-ethoxy-4-methylphenylacetonitrile, 10.1 g. of 1,3-propanediamine, eight drops of carbon disulfide and a heating period of five hours at 140° C.

(9) 2-(α-ethoxybenzyl) - 1 - methyl-1,4,5,6-tetrahydropyrimidine.—20.7 g., B.P. 87–95° C. at 0.02 mm., was prepared as in Example H–8 using 25.8 g. of α-ethoxyphenylacetonitrile, 19 ml. of N-methyl-1,3-propanediamine four drops of carbon disulfide and a heating period of twenty six hours at 130° C.

(10) 2-(3,4 - dichloro - α - ethoxybenzyl)-1,4,5,6-tetrahydropyrimidine.—10.0 g., M.P. 90–92° C., was prepared as in Example H–5 using 23.0 g. of 3,4-dichloro-α-ethoxyphenylacetonitrile, 9.0 g. of 1,3-propanediamine, three drops of carbon disulfide, a heating period of two and one-half hours at 140° C. under a nitrogen atmosphere, ethyl acetate in the work-up and successive recrystallizations from cyclohexane (with charcoal), n-hexane (with charcoal) and ether.

(11) 1,4,5,6-tetrahydro - 2 - (α - n - propoxybenzyl)pyrimidine.—13.8 g., M.P. 86.5–88.5° C., was prepared as in Example H–10 using 17.5 g. of α-n-propoxyphenylacetonitrile, 9.0 of 1,3-propanediamine, five drops of carbon disulfide, a heating period of four hours at 140° C. and recrystallization from ether using decolorizing charcoal.

(12) 2-[α-ethoxy - (2 - naphthyl)methyl]-1,4,5,6-tetrahydropyrimidine.—9.4 g., M.P. 115–117° C., was prepared as in Example H–10 using 10.56 g. of α-ethoxy-2-naphthylacetonitrile, 4.45 g. of 1,3-propanediamine, two drops of carbon disulfide, a heating period of five and one-half hours at 140° C. and recrystallization from cyclohexane using decolorizing charcoal.

(13) 2-(α-ethoxy - 4 - isopropylbenzyl)-1,4,5,6-tetrahydropyrimidine.—11.2 g., M.P. 105–107.5° C., was prepared as in Example H–10 using 20 g. of α-ethoxy-4-isopropylphenylacetonitrile, 9 g. of 1,3-propanediamine, five drops of carbon disulfide, a heating period of five hours at 140° C. and recrystallization from acetonitrile using decolorizing charcoal.

(14) 2-(α - n - butoxybenzyl)-1,4,5,6-tetrahydropyrimidine.—16.7 g., M.P. 54–62° C., was prepared as in Example H–10 using 18.9 g. of α-n-butoxyphenylacetonitrile, 9.0 g. of 1,3-propanediamine, three drops of carbon disulfide and a heating period of four hours at 140° C. The light yellow waxy product, which was not recrystallized, was dried at room temperature and 0.03 mm. for forty-four hours.

(15) 2-[α-ethoxy - (5 - indanyl)methyl$_5$-1,4,5,6-tetrahydropyrimidine.—To a mixture containing 20.1 g. of α-ethoxy-5-indanylacetonitrile and 9 g. of 1,3-propanediamine was added three drops of carbon disulfide and the resulting mixture was stirred under nitrogen at 135–140° C. for four and one-half hours. The volatile liquids were evaporated off at 100° C. and 15 mm. over a fifteen minute period on a rotary evaporator and the residue was diluted with benzene. The benzene solution was washed with brine and extracted with three 100 ml. portions of 2 N aqueous hydrogen chloride. The acidic solution was washed with ether and treated successively with ice and excess 10% aqueous sodium hydroxide solution. The basic solution was extracted with chloroform. The chloroform solution was dried over anhydrous potassium carbonate and evaporated to remove the chloroform. The residue was taken up in ether and the ether solution treated with decolorizing charcoal. The filtrate was concentrated and treated with n-hexane and to cloudiness and the mixture stirred at 0° C. The separated product was collected, washed with n-hexane and dried in vacuo at 50° C. to yield 15.2 g. of 2-[α-ethoxy-(5-indanyl)methyl-1,4,5,6-tetrahydropyrimidine, M.P. 69–75° C.

(16) 2 - (α - ethoxybenzyl) - 1,4,5,6-tetrahydro-5,5-dimethylpyrimidine.—24.8 g., M.P. 92–94° C., was prepared as in Example H–1 using 23.5 g. of α-ethoxyphenylacetonitrile, 16 g. of 2,2 - dimethyl-1,3-propanediamine, four drops of carbon disulfide, a heating period of six hours at 135–140° C. under an atmosphere of nitrogen, hot n-hexane to dissolve the cooled solid reaction mixture and recrystallization from n-hexane using decolorizing charcoal. A solution containing 4 g. of 2-(α-ethoxybenzyl)-1,4,5,6-tetrahydro-5,5-dimethylpyrimidine in 100 ml. of isopropyl alcohol was treated with 5 ml. of concentrated hydrochloric acid and the resulting solution evaporated to dryness. The solid residue was recrystallized from 60 ml. of acetone to yield 3.9 g. of 2-(α-ethoxybenzyl)-1,4,5,6-tetrahydro-5,5-dimethylpyrimidine hydrochloride, M.P. 181–183° C.

(17) 1 - n-butyl-2-(α-ethoxybenzyl)-1,4,5,6-tetrahydropyrimidine.—17.5 g., B.P. 103–110° C. at 0.0075–0.01 mm., was prepared as in Example H–5 using 16.1 g. of α-ethoxyphenylacetonitrile, 13.0 g. of N-n-butyl-1,3-propanediamine, four drops of carbon disulfide and ether in the work-up.

(18) 2 - (4 - chloro-α-ethoxybenzyl)-5-ethyl-1,4,5,6-tetrahydro-5-methylpyrimidine.—5.6 g., M.P. 86–87° C., was prepared as in Example H–16 using 15.6 g. of 4-chloro-α-ethoxyphenylacetonitrile, 10.2 g. of 2-ethyl-2-methyl-1,3-propanediamine, four drops of carbon disulfide, a heating period of seventeen hours at 135–140° C. and three recrystallizations from n-hexane.

(19) 2 - (4-chloro-α-ethoxybenzyl)-1,4,5,6-tetrahydro-5,5 - dimethylpyrimidine, 11.5 g., M.P. 114–115° C., was prepared as in Example H–16 using 19.6 g. of 4-chloro-α-ethoxyphenylacetonitrile, 11.2 g. of 2,2 - dimethyl-1,3-propanediamine, four drops of carbon disulfide, a heating period of seventeen hours at 135° C. and two recrystallizations from ether-n-hexane.

(20) 2 - (2-chloro-α-ethoxybenzyl)-1,4,5,6-tetrahydro-5,5-dimethylpyrimidine.—11.1 g., M.P. 115–116° C., was prepared as in Example H–4 using 19.6 g. of 2-chloro-α-ethoxyphenylacetonitrile, 11.2 g. of 2,2-dimethyl-1,3-propanediamine, four drops of carbon disulfide, a heating period of 135–140° C. for seventeen hours, ether in the work-up and recrystallization from ether-n-hexane.

(21) 2 - (α-ethoxybenzyl)-5-ethyl-1,4,5,6-tetrahydro-5-methylpyrimidine, 12.5 g., B.P. 132–135° C. at 0.15 mm., was prepared as in Example H–16 using 12.9 g. of α-ethoxyphenylacetonitrile, 10.2 g. of 2-ethyl-2-methyl-1,3-propanediamine, four drops of carbon disulfide, a heating period of seventeen hours at 135–140° C. and then distilling the reaction mixture under vacuum to yield said product.

(22) 2 - (α-ethoxy-4-isopropylbenzyl)-1,4,5,6-tetrahydro-5,5-dimethylpyrimidine.—14.5 g., B.P. 137–139° C. at 0.045 mm., was prepared as in Example H–20 using 20.3 g. of α-ethoxy-4-isopropylphenylacetonitrile, 11.2 g. of 2,2-dimethyl-1,3-propanediamine, four drops of carbon disulfide, a heating period of seventeen hours at 135–140° C., ether in the work-up and distilling said product under vacuum.

(23) 2 - (α - ethoxy-4-methoxybenzyl)-1,4,5,6-tetrahydro-5,5-dimethylpyrimidine.—10.4 g., B.P. 138–143° C. at 0.02 mm., was prepared as in Example H–22 using 19.1 g. of α-ethoxy-4-methoxyphenylacetonitrile, 11.2 g. of 2,2-dimethyl-1,3-propanediamine, four drops of carbon disulfide and a reaction period of six hours at 132–135° C.

(24) 2 - (3-fluoro-α-ethoxybenzyl)-1,4,5,6-tetrahydro-5,5 - dimethylpyrimidine.—7.0 g., M.P. 88–89° C., was prepared as in Example H–4 using 17.9 g. of α-ethoxy-3-fluorophenylacetonitrile, 11.2 g. of 2,2-dimethyl-1,3-propanediamine, four drops of carbon disulfide, a heating period of seventeen hours at 130° C., benzene in the work-up and two recrystallizations from n-hexane using decolorizing charcoal.

(25) 2 - [α-ethoxy - (1-naphthyl)methyl]-1,4,5,6-tetrahydro-5,5-methylpyrimidine.—5.4 g., M.P. 106–107° C., was prepared as in Example H–16 using 21.1 g. of α-ethoxy-1-naphthylacetonitrile, 11.2 g. of 2,2-dimethyl-1,3-propanediamine, five drops of carbon disulfide, a heating period of five hours at 135–140° C., and successive recrystalization from ether-n-hexane aqueous methanol and n-hexane.

(26) 2 - (α - ethoxybenzyl)-1,4,5,6-tetrahydo-5-pyrimidinol, 9.4 g., B.P. 148–150° C., at 0.01 mm., was prepared as in Example H–21 using 16.1 g. of α-ethoxyphenylacetonitrile, 10.8 g. of 2-hydroxy-1,3-propanediamine, four drops of carbon disulfide, a heating period of fifteen hours on a steam bath and distillation of said product under vacuum. 2 - (α-ethoxybenzyl)-1,4,5,6-tetrahydro-5-pyrimidinol hydrochloride, M.P. 152–156° C., was prepared by treating an ethanolic solution of the basic product with etheral hydrogen chloride, collecting the hydrochloride and triturating it with acetone and then recrystallizing it twice from ether-acetone.

(27) 2 - (α - ethoxy-α-ethylbenzyl)-1,4,5,6-tetrahydropyrimidine, 20.9 g., M.P. 78.5–81.0° C., was prepared as in Example H–4 using 23.8 g. of α-ethoxy-α-phenylbutyronitrile (2-ethoxy-2-phenylbutanenitrile), 11 g. of 1,3-propanediamine, four drops of carbon disulfide, and a heating period of twenty hours at 165° C., ether in the work-up and recrystallization from n-hexane.

(28) 2 - [α - methoxy - (4-biphenyl)methyl]-1,4,5,6-tetrahydropyrimidine, was prepared as follows: A mixture containing 16.5 g. of α-methoxy - 4-biphenylacetic acid, 7.4 g. of 1,3-propanediamine and 500 ml. of xylene was stirred under reflux with a continuous water separator attached to the reaction vessel. The heating was continued for fourteen hours at which time 3.8 ml. of water had been collected. The reaction mixture was allowed to cool while stirring and then filtered. The filtrate was washed successively with water and 10% aqueous potassium carbonate solution, and then acidified with aqueous hydrochloric acid. The organic layer was separated and extracted three times with 2 N aqueous hydrogen chloride. The acidic extract was extracted with ether and then made basic with aqueous sodium hydroxide solution. The basic solution was extracted with chloroform; the chloroform solution was dried over anhydrous potassium carbonate and then evaporated in vacuo. The residue was crystallized from isopropyl acetate-n-hexane and dried in vacuo at 50° C. to yield 3.8 g. of 2-[α-methoxy-(4-biphenylyl)methyl]-1,4,5,6-tetrahydropyrimidine, M.P. 108–110° C.

(29) 2-(α-ethoxy-4-methoxyl)-1,4,5,6-tetrahydropyrimidine, 10.64 g., B.P. 135–145° C. at 0.06 mm. and M.P. 52–56° C., was prepared as in Example H–21 using 19.1 g. of α-ethoxy-4-methoxyphenylacetonitrile, 9.0 g. of 1,3-propanediamine, five drops of carbon disulfide and a heating period of six hours at 140° C.

(30) 2 - (α - methoxybenzyl) - 1,4,5,6 - tetrahydropyrimidine—Hydrogen sulfide was bubbled through a mixture containing 6.4 g. of α-methoxyphenylacetonitrile and 3.7 g. of 1,3-propanediamine. The ensuing reaction, from which ammonia was evolved, was vigorous and cooling was necessary to control it. After the initial reaction had subsided, the mixture was heated at 95° for fifteen minutes, cooled and treated with dilute aqueous hydrochloric acid. The resulting aqueous solution was clarified by extraction with ether, after which it was made alkaline and extracted with ether. The ether was distilled off and the residue distilled in vacuo to yield 5.3 g. of 2-(α-methoxybenzyl)-1,4,5,6-tetrahydropyrimidine, B.P. 128–129° C. at 0.4 mm. and M.P. 66–68° C. Treatment of an ether solution of this basic compound with ethereal hydrogen chloride yielded 2-(α-methoxybenzyl)-1,4,5,6-tetrahydropyrimidine hydrochloride, M.P. 207–208° C. after recrystallization from isopropyl alcohol-ether.

(31) 2 - (3 - chloro-α-ethoxybenzyl)-1,4,5,6-tetrahydropyrimidine.—9.3 g., M.P. 86–87° C., was prepared as in Example H–4 using 19.6 g. of 3-chloro-α-ethoxyphenylacetonitrile, 8.2 g. of 1,3-propanediamine, four drops of carbon disulfide, a reaction period of three hours at 135–145° C., ether in the work-up and two recrystallizations from n-hexane using decolorizing charcoal during the first recrystallization.

(32) 2 - (4 - chloro-α-ethoxybenzyl)-1,4,5,6-tetrahydro-5-methylpyrimidine.—4.3 g., M.P. 80–81° C., was prepared as in Example H–16 using 19.6 g. of 4-chloro-α-ethoxyphenylacetonitrile, 10.0 g. of 2-methyl-1,3-propanediamine, five drops of carbon disulfide, a heating period of six and one-half hours at 136–140° C. and recrystallizing the cooled reaction mixture several times from n-hexane using decolorizing charcoal during the first recrystallization.

(33) 2 - (α - ethoxybenzyl)-1,4,5,6-tetrahydro-5-methylpyrimidine.—5.5 g., M.P. 97–98° C., was prepared as in Example H-5 using 16.1 g. of α-ethoxyphenylacetonitrile, 10 g. of 2-methyl-1,3-propanediamine, five drops of carbon disulfide, a heating period of five hours at 135–140° C. under nitrogen, ether in the work-up and three recrystallizations from n-hexane using decolorizing charcoal the first time.

(34) 2 - (α - ethoxybenzyl) - 1,4,5,6 - tetrahydro - 5-methoxypyrimidine.—7.3 g., B.P. 140–146° C. at 0.10–0.11 mm. (solidified to a waxy solid of M.P. 63–69° C.), was prepared as in Example H-5 using 13.4 g. of α-ethoxyphenylacetonitrile, 9.2 g. of 2-methoxy-1,3-propanediamine, six drops of carbon disulfide, a heating period of eight hours at 138–140° C. under nitrogen and ether in the work-up.

(35) 2-(α-ethoxy-2-methoxybenzyl)-1,4,5,6-tetrahydropyrimidine, 9.4 g., M.P. 80–82° C., was prepared as in Example H-4 using 19.1 g. of α-ethoxy-2-methoxyphenylacetonitrile, 10 g. of 1,3-propanediamine, five drops of carbon disulfide, a heating period of eighteen hours at 135–145° C. and recrystallization from n-hexane.

(36) 2 - (α - ethoxybenzyl) - 5,5-diethyl-1,4,5,6-tetrahydropyrimidine, B.P. 130–134° C. at 0.03 mm., 12.1 g., was prepared as in Example H-4 using 16.1 g. of α-ethoxyphenylacetonitrile, 14.3 g. of 2,2-diethyl-1,3-propanediamine, 6 drops of carbon disulfide and a heating period of twenty-one hours at 130–135° C. under nitrogen. Ether was used in the work-up and the product was distilled under reduced pressure.

(37) 2 - (4 - chloro - α-ethoxy-α-ethylbenzyl)-1,4,5,6-tetrahydro - 5,5 - dimethylpyrimidine.—M.P. 124–125° C., 4.52 g., was prepared as in Example H-20 using 22.3 g. of 2-(4-chlorophenyl)-2-ethoxybutanenitrile, 12.2 g. of 2,2-dimethyl-1,3-propanediamine, six drops of carbon disulfide and initially a heating period of seventeen hours at 150–152° C. Additional portions of carbon disulfide (total of 35 drops) and 2,2-diethyl-1,3-propanediamine (total of 7.5 g.) were added to the reaction mixture which was heated an additional seven days at about 175° C. Ether was used in the work-up and the product was recrystallized from n-hexane using decolorizing charcoal.

(38) 2 - (4 - chloro - α - ethoxybenzyl)-5,5-diethyl-1,4,5,6-tetrahydropyrimidine.—To a mixture containing 19.6 g. of 4-chloro-α-ethoxyphenylacetonitrile and 14.3 g. of 2,2-diethyl-1,3-propanediamine was added with stirring under an atmosphere of nitrogen, six drops of carbon disulfide and the resulting mixture was stirred under an atmosphere of nitrogen while heating at 130–140° C. for seventeen hours. The reaction mixture was then distilled under reduced pressure to distill off any low boiling diamine intermediate and was then dissolved in 500 ml. of ether. The ether was extracted with two 500 ml. portions of 6 N hydrochloric acid. The acidic extract was washed with ether, made basic with 35% aqueous sodium hydroxide solution and the mixture extracted thoroughly with ether. The ether extract was dried over anhydrous sodium sulfate, distilled in vacuo to remove the ether and then distilled in vacuo to yield 12.2 g. of 2-(4-chloro-α-ethoxybenzyl) - 5,5 - diethyl-1,4,5,6-tetrahydropyrimidine, B.P. 148–150° C. at 0.02 mm. The product solidified on standing at room temperature, and was then recrystallized from n-hexane, using decolorizing charcoal, to yield 7.9 g. of white crystalline 2 - (4-chloro-α-ethoxybenzyl)-5,5-diethyl-1,4,5,6-tetrahydropyrimidine, M.P. 68–70° C. after drying in vacuo for twenty-four hours at 25° C.

(39) 2-(4 - benzyloxy - α - ethoxybenzyl) - 1,4,5,6-tetrahydropyrimidine.—A mixture containing 28.7 g. of α-4-benzyloxy-α-ethoxyphenylacetonitrile, 11 g. of 1,3-propane diamine and four drops of carbon disulfide was heated with stirring at 100–110° C. for sixteen hours. The reaction mixture was poured into water and a 1 to 1 mixture (by volume) of ether and benzene. The organic layer was separated, washed with water and extracted three times with 2 N hydrochloric acid. Excess 35% aqueous sodium hydroxide solution was added with cooling to the aqueous phase and the alkaline mixture was extracted three times with chloroform. The chloroform extract was dried over anhydrous potassium carbonate while treating with decolorizing charcoal, filtered and evaporated in vacuo to remove the chlorofrom, thereby yielding 31.9 g. of 2-(4-benzyloxy-α-ethoxybenzyl)-1,4,5,6-tetrahydropyrimidine.

(40) 2 - (α - ethoxy - 4 - hydroxybenzyl) - 1,4,5,6-tetrahydropyrimidine.—A solution containing 9.7 g. of 2-(4 - benzyloxy - α - ethoxybenzyl) - 1,4,5,6 - tetrahydropyrimidine in 250 ml. of absolute ethanol was mixed with 25 ml. of 5.6 N hydrogen chloride in absolute ethanol and the resulting mixture was refluxed for fifteen minutes and then evaporated in vacuo to remove the ethanol. The residue, a foamy material, was taken up with 50 ml. of 5.6 N hydrochloric acid in absolute ethanol; the mixture was refluxed for an additional one hour and forty-five minutes and evaporated in vacuo to remove the ethanol. After examination of the nuclear magnetic resonance spectrum of the residue had indicated only about 50% debenzylation of the starting material, the residue was taken up in 100 ml. of methanol, 600 mg. of 60% palladium chloride was added and the mixture hydrogenated at 40 p.s.i. for eight hours at room temperature. The reaction mixture was filtered and the filtrate evaporated in vacuo to remove the solvent to leave 5.8 g. of 2-(α - ethoxy - 4 - hydroxybenzyl) - 1,4,5,6 - tetrahydropyrimidine as its hydrochloride, an amorphorus white solid.

(41) 2 - [α - ethoxy - 2(and 4)-nitrobenzyl] - 1,4,5,6-tetrahydropyrimidine.—A 5.0 g. portion of 2-(α-ethoxybenzyl) - 1,4,5,6 - tetrahydropyrimidine hydrochloride was added with swirling and cooling to 25 ml. of concentrated sulfuric acid. The acidic solution was cooled to about 0–5° C. and 5 ml. of fuming nitric acid was added slowly with swirling whereupon the temperature rose to about 18° C. The reaction mixture was cooled in an ice bath for two hours, poured onto ice and made basic with a slight excess of 35% aqueous sodium hydroxide solution. The alkaline solution was extracted with chloroform; the extract dried over anhydrous potassium carbonate while treating with decolorizing charcoal, filtered and evaporated in vacuo to remove the chloroform. The oily residue was dissolved in isopropyl alcohol and the solution treated with 10 ml. of 5.6 N hydrogen chloride in ethanol and the solvents removed by distilling in vacuo. Isopropyl alcohol was added to the residue and then removed by distilling in vacuo. The residue was crystallized from acetone-ether, then recrystallized from acetonitrile-acetone and dried in vacuo at 50° C. to yield 1.5 g. of a mixture of 2-(α-ethoxy-2-nitrobenzyl) - 1,4,5,6-tetrahydropyrimidine hydrochloride and 2 - (α -ethoxy - 4-nitrobenzyl) - 1,4,5,6 - tetrahydropyrimidine hydrochloride, M.P. 202–208° C. The nuclear magnetic resonance spectrum indicates the mixture to consist of about 80% of the 2-nitro compound and about 20% of the 4-nitro compound.

(42) 2 - (α - ethoxy - 1,4,5,6 - tetrahydrobenzyl)-1,4,5,6 - tetrahydropyrimidine.—To a stirred mixture containing 24 g. of α-ethoxy-3-cyclohexenylacetonitrile, 15 g. of 1,3-propanediamine under an atmosphere of nitrogen was added six drops of carbon disulfide and the resulting mixture heated with stirring under an atmosphere of nitrogen for forty-four hours at 135–145° C. The reaction mixture was distilled under reduced pressure to remove any excess diamine and the residual oily material was dissolved in ether. The ether solution was extracted with 2 N hydrogen chloride. The acidic extract was washed with ether and then made basic with 3 N sodium hydroxide solution and the resulting milky suspension extracted several times with ether (total of 1000 ml.). The ether extract was dried over anhydrous magnesium sulfate and distilled in vacuo to remove the ether and the residue distilled to yield a fraction boiling at 103–105° C. at 0.02 mm. This fraction, which partially solidified, was distilled again to yield 10.15 g. of 2-(α-ethoxy-1,4, 5,6-tetrahydrobenzyl) - 1,4,5,6-tetrahydropyrimidine, B.P. 93–96° C. at 0.015–0.018 mm. The product solidified on standing, M.P. 76–77° C.

(43) 2 - (3 - chloro - α - ethoxybenzyl) - 1,4,5,6 - tetrahydro - 5,5 - dimethylpyrimidine, M.P. 82–83° C., 8.0 g., was prepared as in Example H–20 using 13.8 g. of 3-chloro - α - ethoxyphenylacetonitrile, 9.0 g. of 2,2-dimethyl-1,3-propanediamine, six drops of carbon disulfide and recrystallization from n-hexane using decolorizing charcoal.

(44) 2- (3 - chloro - α - ethoxybenzyl) - 5,5 - diethyl-1,4,5,6-tetrahydropyrimidine.—B.P. 136–138° C. at 0.012–0.015 mm., 7.2 g., was prepared as in Example H–21 using 13.8 g. of 3-chloro-α-ethoxyphenylacetonitrile, 11.7 g. of 2,2-diethyl-1,3-propanediamine, six drops of carbon disulfide and three vacuum distillations of the product.

(45) 2 - (α - ethoxy - 3 - fluorobenzyl) - 5,5 - diethyl-1,4,5,6-tetrahydropyrimidine.—B.P. 124–126° C. at 0.015–0.030 mm., 8.4 g., was prepared as in Example H–21 using 14.0 g. of α-ethoxy-3-fluorophenylacetonitrile, 11.0 g. of 2,2-diethyl-1,3-propanediamine and six drops of carbondisulfide.

(46) 2 - (2 - amino- 4 - chloro - α - ethoxybenzyl)-1,4,5,6 - tetrahydro - 5,5 - dimethylpyrimidine is prepared by catalytic hydrogenation of an ethanol solution of 2-(4-chloro-α-ethoxy-2-nitrobenzyl) - 1,4,5,6 -tetrahydro - 5,5-dimethylpyrimidine in the presence of two equivalents of hydrogen chloride over 10% palladium on charcoal at three atmospheres of hydrogen at room temperature. After completion of the hydrogenation, the reaction mixture is filtered and the ethanol removed from the filtrate to yield the product in the form of its dihydrochloride.

(47) 2 - [4 - (and 2) - amino - α - ethoxybenzyl] - 1,4,5,6-tetrahydropyrimidine is obtained as in Example H–46 using a corresponding molar equivalent quantity of 2-[α-ethoxy - 2 - (and 4) - nitrobenzyl] - 1,4,5,6 - tetrahydropyrimidine (from Example H–41).

(48) 2 - (α-ethoxycyclohexylmethyl) - 1,4,5,6 - tetrahydrobyrimidine.—In a hydrogenation vessel was placed 30 ml. of absolute ethanol and 1 g. of platinium dioxide. The dioxide was reduced under hydrogen until uptake was complete. To the platinium suspension was added a solution containing 4.0 g. of 2-(α-ethoxy-1,4,5,6-tetrahydrobenzyl)-1,4,5,6 - tetrahydropyrimidine, 30 ml. of ethanol and 5 ml. of 4.9 N ethanolic hydrogen chloride, thereby yielding a mixture having a pH of 2. Hydrogenation was accomplished at atmospheric pressure and room temperature over a period of about six hours. The catalyst was filtered off through a pad of infusorial earth and the filtrate was distilled at 50° C. and 10 mm. to remove the solvents. The remaining oily residue was dissolved in 10 ml. of ice water and made basic with 20% aqueous sodium hydroxide solution. The alkaline solution was extracted with ether. The ether extract was dried over anhydrous magnesium sulfate and the ether distilled off in vacuo. The oily residue was dissolved in 50 ml. of n-hexane, and the solution treated with decolorizing charcoal and filtered. The filtrate was concentrated to a volume of about 20 ml. and cooled. The crystalline precipitate was collected and dried in vacuo for four hours to yield 1.82 g. of 2-(α-ethoxycyclohexylmethyl)-1,4,5,6-tetrahydropyrimidine, M.P. 99–100° C.

(49) 2 - (α - ethoxy - 3 - fluoro - 4 - methoxybenzyl)-1.4,5,6-tetrahydropyrimidine.—6.9 g., B.P. 137–140° C. at 0.06–0.07 mm. (solidified to a waxy solid of M.P. 77–79° C.), was prepared as in Example H–4 using 14.7 g. of α - ethoxy - 3 - fluoro - 4 - methoxyphenylacetonitrile, 6.0 g. of 1,3-propanediamine, six drops of carbon disulfide and a heating period of seventeen hours.

(50) 2 - (α - ethoxy - 3 - fluoro - 4 - methoxybenzyl)-1,4,5,6 - tetrahydro - 5,5 - dimethylpyrimidine.—16.2 g., B.P. 148–149° C. at 0.07–0.08 mm. (solidified, M.P. 83—85° C.), was prepared as in Example H–4 using 20.9 g. of α-ethoxy-3-fluoro-4-methoxyphenylacetonitrile, 11.2 g. of 2,2 - dimethyl - 1,3 - propanediamine, six drops of carbon disulfide and a heating period of twenty hours.

Following the procedure described in Example H, e.g., H–1, H–4, H–10 or H–16, using corresponding molar equivalent quantities of the appropriate α-(lower-alkoxy)-phenylacetonitrile or 2-(lower-alkoxy)-2-phenylalkanenitrile and 1,3-alkanediamine, the following 2-[α-(lower-alkoxy)-benzyl]-1,4,5,6 - tetrahydropyrimidines are obtained:

2-(3-chloro-α-ethoxybenzyl)-1,4,5,6-tetramethyl-1,4,5,6-tetrahydropyrimidine using 3-chloro-α-ethoxyphenylacetonitrile and N',2-dimethyl-2,4-pentanediamine;

2-(2-chloro-α,4-diethoxybenzyl)-4,6-dimethyl-1,4,5,6-tetrahydropyrimidine using 2-chloro-α-4-diethoxyphenylacetonitrile and 2,4-pentanediamine;

2-(2,4-dibromo-α-ethoxybenzyl)-4(or 6)-ethyl-5-methyl-1,4,5,6-tetrahydropyrimidine using 2,4-dibromo-α-ethoxyphenylacetonitrile and 2-methyl-1,3-pentanediamine;

2-(α-ethoxy-4-dimethylaminobenzyl)-5-ethyl-4(or 6)-n-propyl-1,4,5,6-tetrahydropyrimidine using α-ethoxy-4-dimethylaminophenylacetonitrile and 2-methyl-1,3-hexanediamine;

2-(α-ethoxy-3-fluorobenzyl)-1-n-hexyl-1,4,5,6-tetrahydropyrimidine using α-ethoxy-3-fluorophenylacetonitrile and N-n-hexyl-1,3-propanediamine;

2-(α-ethoxy-4-ethylbenzyl)-5-isobutyl-5-methyl-1,4,5,6-tetrahydropyrimidine using α-ethoxy-4-ethylphenylacetonitrile and 2-isobutyl-2-methyl-1,3-propanediamine;

2-(α-ethoxy-3,4,5-trimethoxybenzyl)-5-n-butyl-5-ethyl-1,4,5,6-tetrahydropyrimidine using α-ethoxy-3,4,5-trimethoxyphenylacetonitrile and 2-n-butyl-2-ethyl-1,3-propanediamine;

2-(4-n-butoxy-α-ethoxybenzyl)-5,5-dimethyl-1,4,5,6-tetrahydropyrimidine using 4-n-butoxy-α-ethoxyphenylacetonitrile and 2,2-dimethyl-1,3-propanediamine;

2-(α-ethoxy-2,4-dimethylbenzyl)-5,5-diethyl-1,4,5,6-tetrahydropyrimidine using α-ethoxy-2,4-dimethylphenylacetonitrile and 2,2-diethyl-1,3-propanediamine;

2-(α-ethoxy-4-fluoro-2-methoxybenzyl)-5-methyl-5-n-propyl-1,4,5,6-tetrahydropyrimidine using α-ethoxy-5-fluoro-2-methoxyphenylacetonitrile and 2-methyl-2-n-propyl-1,3-propanediamine;

2-(α-ethoxy-4-methylmercaptobenzyl)-5,5-dimethyl-1,4,5,6-tetrahydropyrimidine using α-ethoxy-4-methylmercaptophenylacetonitrile and 2,2-dimethyl-1,3-propanediamine;

2-(α-ethoxy-2,4,6-trimethylbenzyl)-5-methyl-1,4,5,6-tetrahydropyrimidine using α-ethoxy-2,4,6-trimethylphenylacetonitrile and 2-methyl-1,3-propanediamine;

2-(α-ethoxy-4-n-hexoxybenzyl)-1,4,5,6-tetrahydropyrimidine using α-ethoxy-4-n-hexoxyphenylacetonitrile and 1,3-propanediamine;

2-(α-ethoxy-3,5-diiodobenzyl)-5,5-dimethyl-1,4,5,6-tetrahydropyrimidine using α-ethoxy-3,5-diiodophenylacetonitrile and 2,2-dimethyl-1,3-propanediamine;

2-(4-n-butylmercapto-α-ethoxybenzyl)-5,5-dimethyl-1,4,5,6-tetrahydropyrimidine using 4-n-butylmercapto-α-ethoxyphenylacetonitrile and 2,2-dimethyl-1,3-propanediamine;

2-(α-ethoxy-4-methylsulfonylbenzyl)-5,5-dimethyl-1,4,5,6-tetrahydropyrimidine using α-ethoxy-4-methylsulfonylphenylacetonitrile and 2,2-dimethyl-1,3-propanediamine;

2-(α-ethoxy-4-ethylsulfonylbenzyl)-5,5-dimethyl-1,4,5,6-tetrahydropyrimidine using α-ethoxy-4-ethylsulfonylphenyl acetonitrile and 2,2-dimethyl-1,3-propanediamine;

2-(α-ethoxy-4-nitrobenzyl)-5,5-dimethyl-1,4,5,6-tetrahydropyrimidine using α-ethoxy-4-nitrophenylacetonitrile and 2,2-dimethyl-1,3-propanediamine;

2 - (4-amino-α-ethoxybenzyl)-5,5-dimethyl-1,4,5,6-tetrahydropyrimidine was prepared by treating the corresponding 2 - (α-ethoxy-4-nitrobenzyl)-5,5-dimethyl-1,4,5,6-tetrahydropyrimidine with a reducing agent effective to reduce nitro groups to amino groups, e.g., iron and hydrochloric acid or by catalytic hydrogenation in the presence of two molar equivalents of hydrogen chloride using palladium on charcoal;

2-(α-ethoxy-3-trifluoromethylbenzyl)-5,5-dimethyl-1,4,-5,6-tetrahydropyrimidine using α-ethoxy-3-trifluoromethylphenylacetonitrile and 2,2-dimethyl-1,3-propanediamine;

2-(4-chloro-α-hexoxybenzyl)-5,5-dimethyl-1,4,5,6-tetrahydropyrimidine using 4-chloro-α-n-hexoxyphenylacetonitrile and 2,2-dimethyl-1,3-propanediamine;

2-(α-ethoxy-α-methylbenzyl)-1,4,5,6-tetrahydropyrimidine using 2-ethoxy-2-phenylpropanenitrile and 1,3-propanediamine;

2-(4-chloro-α-ethoxy-α-n-propylbenzyl)-5-methyl-1,4,5,6-tetrahydropyrimidine using 2-(4-chlorophenyl)-2-ethoxypentanenitrile and 2-methyl-1,3-propanediamine;

2-(α-n-butyl-3-chloro-α-ethoxybenzyl)-5,5-dimethyl-1,4,5,6-tetrahydropyrimidine using 2-(3-chlorophenyl)-2-ethoxyhexanenitrile and 2,2-dimethyl-1,3-propanediamine;

2-(α-allyl-α-ethoxy-3-fluorobenzyl)-1,4,5,6-tetrahydropyrimidine using 2-ethoxy-2-(3-fluorophenyl)-4-pentenenitrile and 1,3-propanediamine;

2-(α-ethoxy-α-n-hexylbenzyl)-1,4,5,6-tetrahydropyrimidine using α-ethoxy-α-phenyloctanenitrile and 1,3-propenediamine;

2-(3-chloro-α-ethoxybenzyl)-5-ethyl-5-methyl-1,4,5,6-tetrahydropyrimidine using 3-chloro-α-ethoxyphenylacetonitrile and 2-ethyl-2-methyl-1,3-propanediamine;

2-(α-ethoxy-3-fluorobenzyl)-5-ethyl-5-methyl-1,4,5,6-tetrahydropyrimidine using α-ethoxy-3-fluorophenylacetonitrile and 2-ethyl-2-methyl-1,3-propanediamine;

2-(α-ethoxy-3-fluoro-4-methoxybenzyl)-5-ethyl-5-methyl-1,4,5,6-tetrahydropyrimidine using α-ethoxy-3-fluoro-4-methoxyphenylacetonitrile and 2-ethyl-2-methyl-1,3-propanediamine;

2-(α-ethoxy-3-fluoro-4-methoxybenzyl)-5,5-diethyl-1,4,5,6-tetrahydropyrimidine using α-ethoxy-3-fluoro-4-methoxyphenylacetonitrile and 2,2-diethyl-1,3-propanediamine;

2-(4-chloro-α-ethoxy-2-nitrobenzyl)-5,5-dimethyl-1,4,5,6-tetrahydropyrimidine using 4-chloro-α-ethoxy-2-nitrophenylacetonitrile and 2,2-dimethyl-1,3-propanediamine.

(I) 2-[ALPHA-(LOWER-ALKOXY)-BENZYL]-4,5,6,7-TETRAHYDRO-1H-1,3-DIAZEPINES (1) 2-(α-ethoxybenzyl-4,5,6,7-tetrahydro-1H-1,3 - diazepine.—To a mixture containing 16.1 g. of α-ethoxyphenylacetonitrile and 12 ml. of 1,4-butanediamine was added five drops of carbon disulfide and the resulting mixture was heated under an atmosphere of nitrogen for twenty hours at 110° C. The cooled reaction mixture was dissolved in 200 ml. of chloroform. The chloroform solution was washed with water, dried over anhydrous sodium sulfate and distilled in vacuo to remove the chloroform. The residue was then distilled under reduced pressure to yield 8.8 g. of 2-(α-ethoxybenzyl)-4,5,6,7-tetrahydro-1H-1,3-diazepine, B.P. 110–113° C. at 0.06 mm.

(2) 2 - (2-chloro-α-ethoxybenzyl)-4,5,6,7-tetrahydro-1H-1,3-diazepine.—21.3 g., B.P. 124–130° C. at 0.05 mm., was prepared as in Example I–1 using 19.6 g. of 2-chloro-α-ethoxyphenylacetonitrile, 14 ml. of 1,4-butanediamine, five drops of carbon disulfide and a heating period of twenty-nine hours on a steam bath under nitrogen. 2-(2-chloro-α-ethoxybenzyl)-4,5,6,7-tetrahydro - 1H-1,3 - diazepine hydrochloride, M.P. 73–74° C., was prepared by treating an ether solution of the basic diazepine with ethereal hydrogen chloride and collecting the precipitated hydrochloride. Similarly, 2 - (2-chloro-α-ethoxybenzyl)-4,5,6,7 - tetrahydro - 1H - 1,3-diazepine cyclohexanesulfamate, M.P. 128–130° C., was prepared by treating an acetone solution of the basic diazepine with an acetone solution of cyclohexanesulfamic acid and collecting the precipitated cyclohexanesulfamate.

(3) 2 - (4 - chloro-α-ethoxybenzyl)-4,5,6,7-tetrahydro-1H-1,3-diazepine.—33.2 g., B.P. 139–142° C. at 0.03 mm., was prepared as in Example I–1 using 39.2 g. of 4-chloro-α-ethoxyphenylacetonitrile, 28 ml. of 1,4-butanediamine, seven drops of carbon disulfide and a heating period of thirty-two hours on a steam bath under nitrogen. The distilled product on cooling solidified as a white waxy material which melted at about 39° C.

Following the procedure described in Example I–1 using corresponding molar equivalents of the appropriate α-(lower-alkoxy)phenylacetonitrile or 2-(lower-alkoxy)-2-phenylalkanenitrile and 1,4-alkanediamine, the following 2 - [α-(lower-alkoxy)-benzyl]-4,5,6,7-tetrahydro-1H-1,3 - diazepines are obtained:

2-(3-chloro-α-ethoxybenzyl)-1-methyl-4,5,6,7-tetrahydro-1H-1,3-diazepine using 3-chloro-α-ethoxyphenylacetonitrile and N-methyl-1,4-butanediamine;

3-(α-ethoxy-3-fluorobenzyl)-1-isoamyl-4,5,6,7-tetrahydro-1H-1,3-diazepine using α-ethoxy-3-fluorophenylacetonitrile and N-isoamyl-1,4-butanediamine;

2-(3,4-dichloro-α-ethoxybenzyl)-1-ethyl-4-methyl-4,5,6,7-tetrahydro-1H-1,3-diazepine using 3,4-dichloro-α-ethoxyphenylacetonitrile and $N^1$-ethyl-1,4-pentanediamine;

2-(α-ethoxy-1-naphthylmethyl)-4,5,6,7-tetrahydro-1H-1,3-diazepine using α-ethoxy-1-naphthylacetonitrile and 1,4-butanediamine;

2-(α-ethoxy-5-indanylmethyl)-4,5,6,7-tetrahydro-1H-1,3-diazepine using α-ethoxy-4-indanylacetonitrile and 1,4-butanediamine;

2-(α-ethoxy-3-trifluoromethylbenzyl-4,5,6,7-tetrahydro-1H-1,3-diazepine using α-ethoxy-3-trifluoromethylphenylacetonitrile and 1,4-butanediamine;

2-(α-ethoxy-4-methylbenzyl)-4,5,6,7-tetrahydro-1H-1,3-diazepine using α-ethoxy-4-methylphenylacetonitrile and 1,4-butanediamine;

2-(α-ethoxy-4-methoxybenzyl)-4,5,6,7-tetrahydro-1H-1,3-diazepine using α-ethoxy-4-methoxyphenylacetonitrile and 1,4-butanediamine;

2-(α-ethoxy-4-dimethylaminobenzyl)-4,5,6,7-tetrahydro-1H-1,3-diazepine using α-ethoxy-4-dimethylaminophenylacetonitrile and 1,4-butanediamine;

2-(α-ethoxy-4-methylmercaptobenzyl)-4,5,6,7-tetrahydro-1H-1,3-diazepine using α-ethoxy-4-methylmercaptophenylacetonitrile and 1,4-butanediamine;

2-(α-ethoxy-4-methylsulfonylbenzyl)-4,5,6,7-tetrahydro-1H-1,3-diazepine using α-ethoxy-4-methylsulfonylphenylacetonitrile and 1,4-butanediamine;

2-(α-ethoxy-4-nitrobenzyl)-4,5,6,7-tetrahydro-1H-1,3-diazepine using α-ethoxy-4-nitrophenylacetonitrile and 1,4-butanediamine;

2-(α-ethoxy-4-biphenylylmethyl)-4,5,6,7-tetrahydro-1H-1,3-diazepine using α-ethoxy-4-biphenylylacetonitrile and 1,4-butanediamine;

2-(4-chloro-α-ethoxybenzyl)-4,6(or 5,7)-dimethyl-4,5,6,7-tetrahydro-1H-1,3-diazepine using 4-chloro-α-ethoxyphenylacetonitrile and 2-methyl-1,4-pentanediamine;

2-(α-ethoxybenzyl)-5(or 6)-methoxy-4,5,6,7-tetrahydro-1H-1,3-diazepine using α-ethoxyphenylacetonitrile and 2-methoxy-1,4-butanediamine.

The anti-inflammatory activity was measured by the inhibition of carrageenin-induced local foot edema in fasted rats generally according to the procedure of C. A. Winter et al., Proc. Soc. Exptl. & Med. 111, 544–547 (1962) as follows: Food is withdrawn from male albino rats weighing approximately 110–124 gms., eighteen hours prior to a single oral medication of the test compound. Each compound is administered to at least five rats. One hour following the medication, 0.05 ml. of 1% aqueous suspension of carrageenin is injected into the plantar tissue of the right hind foot. Three hours after injections, the rats are sacrificed and the hind feet cut off at the tibiocalcaneo-talar joint or subsequent weighing. The observed difference between the average edema weight of the control and medicated rats is expressed as percent inhibition of edema. When tested by the above-described procedure, 2 - [α-(lower-alkoxy)-arylmethyl]-2-imidazolines, -1,4,5,6-tetrahydropyrimidines and -4,5,6,7-tetrahydro-1H-1,3-diazepines of the invention were found to inhibit local edema due to carrageenin-induced inflammation when administered at oral dose levels between about 6 and 400 mg./kg.

The hypoglycemic activity was measured by the percent decrease in blood glucose levels from premedicated blood glucose levels in fasted rats generally according to the procedure of Dulin et al., Proc. Soc. Exptl. & Med. 107, 245 (1961), wherein glucose-primed rats were bled from the tail vein at 1, 2, 3 and 5 hours following medication. Hypoglycemic activity is expressed as the percent decrease in blood glucose from the control animals at the same hour. When tested by this procedure, the compounds of the invention were found to have hypoglycemic activity when administered at oral dose levels between about 10 and 1000 mg./kg.

The diuretic activity was measured by the natriuretic response produced in rats generally according to the procedure of Williamson et al., J. Pharm. & Exptl. Therap. 126, 82 (1959), using male albino rats, 160–200 g., which have been fasted overnight. The compound to be tested is administered orally in 0.5% gum tragacanth in 0.85% NaCl at a volume of 25 ml./100 g. body weight. The compound is administered to six animals at each dose level. Twelve control (no drug) animals and six animals treated with 8 micromoles/kg. of hydrochlorothiazide are run in each experiment. A fixed molar dose schedule for drugs is used. The highest dose used is 50 micromoles/kg. Succeeding doses are 40% of each preceding dose. Testing of a compound is completed when it no longer produces a natriuretic response which is significantly greater than that of the non-drug-treated groups. The dose of drug which produces a response 0.50 times that of the reference drug, hydrochlorothiazide, is then reported as the approximate minimal effective dose of the AMED-Na. When tested by the above-described procedure, 2-[α-(lower-alkoxy)-benzyl]-1,4,5,6-tetrahydropyrimidines and 4,5,6,7-tetrahydro - 1H - 1,3-diazepines of the invention were found to have diuretic activity when administered at oral dose levels between about 2 and 50 micromoles/kg.

The actual determination of the numerical biological data definitive for a particular compound is readily obtained by standard test procedures, referred to above, by technicians versed in pharmacological test procedures, without any need for any extensive experimentation.

The compounds of Formula I above can be prepared for use by conventional pharmaceutical procedures: that is, by dissolving or suspending them in a pharmaceutical acceptable vehicle, e.g., aqueous alcohol, glycol, oil solution, or oil-water emulsion, for parenteral or oral administration; by incorporating them in unit dosage form as tablets or capsules for oral administration either alone or in combination with conventional adjuvants, e.g., calcium carbonate, starch, lactose, talc, magnesium stearate, gum acacia, and the like.

The subject matter which the applicant regards as his invention is particularly pointed out and distinctly claimed as follows:

1. A compound having the formula

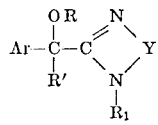

wherein:
R is lower-alkyl,
R' is hydrogen, lower-alkyl or lower-alkenyl,
$R_1$ is hydrogen or lower-alkyl,
Y is alkylene of 4–8 carbon atoms in which 4 carbon atoms intervene between the valence linkages and
Ar is phenyl, naphthyl, indanyl, biphenylyl, cyclohexenyl, cyclohexyl and phenyl substituted by from one to three substituents selected from lower-alkyl, loweralkoxy, halo, trihalomethyl, lower-alkylmercapto, lower-alkylsulfonyl, di(lower-alkyl)amino, amino, hydroxy, nitro and benzyloxy.

2. 2 - [α - (lower - alkoxy - Ar-methyl]4,5,6,7-tetrahydro-1H-1,3-diazepine according to claim 1 wherein four carbon atoms intervene between the valence linkages of alkylene.

3. 2 - (2 - chloro - α-ethoxybenzyl)-4,5,6,7-tetrahydro-1H-1,3-diazepine according to claim 2 where Ar is 2-chlorophenyl, R is ethyl, R' and $R_1$ are each hydrogen, and Y is $CH_2CH_2CH_2CH_2$.

4. 2-(α-ethoxybenzyl)-4,5,6,7-tetrahydro-1H-1,3-diazepine according to claim 2 where Ar is phenyl, R is ethyl, R' and $R_1$ are each hydrogen, and Y is $CH_2CH_2CH_2CH_2$.

5. 2 - (p-chloro-α-ethoxybenzyl)-4,5,6,7-tetrahydro-1H-1,3-diazepine according to claim 2 where Ar is 4-chlorophenyl, R is ethyl, R' and $R_1$ are each hydrogen, and Y is $$CH_2CH_2CH_2CH_2$$

References Cited

UNITED STATES PATENTS 3,332,948  7/1967  Blater _____ 260—251

OTHER REFERENCES

Eldersfield, (ed.) Heterocyclic Compounds, vol. 9, (1967) pp. 311–312.
Oxley et al. J. Chem. Soc. (1947) 497–505.
Oxley et al. J. Chem. Soc. (1950) 859–864.

ALEX MAZEL, Primary Examiner

J. A. NARCAVAGE, Assistant Examiner

U.S. Cl. X.R.

260—251 R, 256.4 H, 309.6, 465 F, 599, 611 A; 424—244, 251, 273